US012490056B2

(12) United States Patent
Tasaki et al.

(10) Patent No.: US 12,490,056 B2
(45) Date of Patent: Dec. 2, 2025

(54) INFORMATION PROCESSING METHOD, INFORMATION PROCESSING DEVICE, AND NON-TRANSITORY COMPUTER READABLE RECORDING MEDIUM STORING INFORMATION PROCESSING PROGRAM

(71) Applicant: Panasonic Intellectual Property Corporation of America, Torrance, CA (US)

(72) Inventors: Nobuaki Tasaki, Osaka (JP); Masahiro Taguchi, Osaka (JP); Ayaka Mitani, Osaka (JP)

(73) Assignee: PANASONIC INTELLECTUAL PROPERTY CORPORATION OF AMERICA, Torrance, CA (US)

( * ) Notice: Subject to any disclaimer, the term of this patent is extended or adjusted under 35 U.S.C. 154(b) by 372 days.

(21) Appl. No.: 18/121,376

(22) Filed: Mar. 14, 2023

(65) Prior Publication Data

US 2023/0224677 A1   Jul. 13, 2023

Related U.S. Application Data

(63) Continuation of application No. PCT/JP2021/019560, filed on May 24, 2021.

(30) Foreign Application Priority Data

Sep. 15, 2020   (JP) .................................. 2020-154692

(51) Int. Cl.
*H04W 4/029*   (2018.01)
*H04W 4/40*   (2018.01)

(52) U.S. Cl.
CPC ............. *H04W 4/029* (2018.02); *H04W 4/40* (2018.02)

(58) Field of Classification Search
CPC ......... H04W 4/80; H04W 4/029; H04W 4/40; H04W 4/027; G01S 19/426; G01S 19/14; G01S 5/017; G08G 1/20
See application file for complete search history.

(56) References Cited

U.S. PATENT DOCUMENTS

2008/0016213 A1* 1/2008 Akinaga ............... H04L 41/142
709/226
2018/0101179 A1* 4/2018 Louey ..................... B60L 50/52
(Continued)

FOREIGN PATENT DOCUMENTS

JP   2019-032310 A   2/2019
JP   2020-024644 A   2/2020
(Continued)

OTHER PUBLICATIONS

International Search Report (English Language Translation), mailed Aug. 10, 2021, by the Japan Patent Office (JPO), in International Application No. PCT/JP2021/019560.

*Primary Examiner* — Muhammad N Edun
(74) *Attorney, Agent, or Firm* — Greenblum & Bernstein, P.L.C.

(57) ABSTRACT

A server acquires, from a terminal owned by a user, pairing information in which a user ID for identifying the user and a mobility ID for identifying a mobility used by the user are associated with each other; continuously acquires, from the terminal, terminal position information indicating a position of the terminal and associated with the user ID; specifies a user ID of a user using the mobility that is stopped, based on the pairing information; and determines, as position information of the mobility, the terminal position information associated with the user ID having been specified.

11 Claims, 16 Drawing Sheets

(56) References Cited

U.S. PATENT DOCUMENTS

| | | |
|---|---|---|
| 2020/0342765 A1 | 10/2020 | Fukumori et al. |
| 2021/0125196 A1 | 4/2021 | Sugimoto et al. |
| 2022/0240213 A1* | 7/2022 | Ly .................. H04W 48/18 |

FOREIGN PATENT DOCUMENTS

| | | |
|---|---|---|
| WO | 2019/087595 | 5/2019 |
| WO | 2019/193852 A1 | 10/2019 |

* cited by examiner

INFORMATION PROCESSING METHOD, INFORMATION PROCESSING DEVICE, AND NON-TRANSITORY COMPUTER READABLE RECORDING MEDIUM STORING INFORMATION PROCESSING PROGRAM

TECHNICAL FIELD

The present disclosure relates to a technique for specifying position information of a mobility.

BACKGROUND ART

The global positioning system (GPS) is conventionally used to measure a position of a mobility. The mobility includes a GPS receiver that measures a current position by receiving a GPS signal transmitted from a GPS satellite. Thus, measurement accuracy of the position using the GPS depends on a radio wave condition. For example, the radio wave condition is poor at a place such as around a lower part of a building, so that the measurement accuracy of the position using the GPS deteriorates.

For example, Patent Literature 1 discloses a beacon device that is installed in a standby place, and transmits, to the surroundings, a signal including a beacon device ID for identifying the beacon device. When a vehicle enters the standby place, a communication terminal moving together with the vehicle receives the signal from the beacon device, and transmits, to a server, the beacon device ID included in the received signal and a communication terminal ID for identifying the communication terminal. By receiving the beacon device ID and the communication terminal ID, the server detects that a vehicle equipped with the communication terminal specified by the communication terminal ID has entered the standby place specified by the beacon device ID.

For example, in Patent Literature 2, in a case of failing to receive four GPS signals from a GPS satellite, a positioning device measures the position of the positioning device by using a GPS signal from a mobile terminal in a line-of-sight environment as viewed from the positioning device, and obtains position information.

However, in the conventional technique described above, it is necessary to install a facility for specifying position information of a mobility with high accuracy near a stopping place, and further improvement is required.

CITATION LIST

Patent Literature

Patent Literature 1: JP 2020-24644 A
Patent Literature 2: JP 2019-32310 A

SUMMARY OF INVENTION

The present disclosure has been made to solve the above problem, and an object thereof is to provide a technique that enables position information a mobility to be specified with high accuracy.

An information processing method according to the present disclosure includes, by a computer, acquiring, from a terminal owned by a user, pairing information in which a user ID for identifying the user and a mobility ID for identifying a mobility used by the user are associated with each other, continuously acquiring, from the terminal, terminal position information indicating a position of the terminal and associated with the user ID, specifying a user ID of a user using the mobility that is stopped, based on the pairing information, and determining, as position information of the mobility, terminal position information associated with the user ID having been specified.

According to the present disclosure, position information of a mobility can be specified with high accuracy.

DESCRIPTION OF EMBODIMENTS

Underlying Knowledge of Present Disclosure

Figure 1:
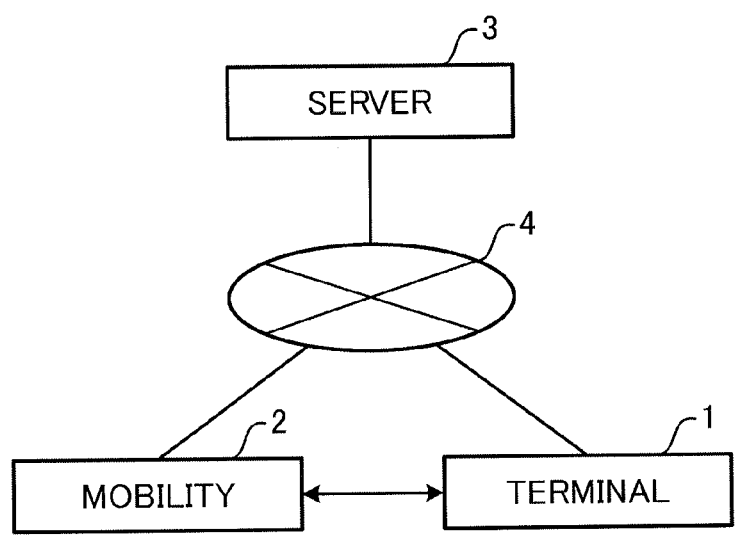
FIG. 1 is a view illustrating an overall configuration of a mobility management system in a first embodiment of the present disclosure.

In recent years, a service for sharing a bicycle by a plurality of users has been provided. Such a service allows the bicycle to be lent out from a bicycle-parking place provided in advance and to be returned to the bicycle-parking place. The bicycle is equipped with a GPS receiver, and a position of the bicycle is measured using a GPS signal received by the GPS receiver. The bicycle is managed by a server that manages the position of the bicycle using position information received from the bicycle.

Here, in a case where the bicycle-parking place is installed in a place with poor radio wave conditions such as around a lower part of a building, the measurement accuracy of the position of the bicycle parked in the bicycle-parking place is deteriorated. In this case, it is difficult for the server to confirm whether the bicycle is correctly returned to the predetermined bicycle-parking place.

In the technique of Patent Literature 1 described above, the beacon device can confirm that the vehicle has entered the standby place. However, use of this technique requires installation of the beacon device in each bicycle-parking place, and requires management of timing of replacing a battery of the beacon device.

The technique of Patent Literature 2 described above allows the positioning device to perform positioning using a GPS signal received from another mobile terminal as a pseudo satellite. However, this case requires facility installation on the ground, and the facility installation is costly.

In order to solve the above problems, an information processing method according to one aspect of the present disclosure includes, by a computer, acquiring, from a terminal owned by a user, pairing information in which a user ID for identifying the user and a mobility ID for identifying a mobility used by the user are associated with each other, continuously acquiring, from the terminal, terminal position information indicating a position of the terminal and associated with the user ID, specifying a user ID of a user using the mobility that is stopped, based on the pairing information, and determining, as position information of the mobility, terminal position information associated with the user ID having been specified.

According to this configuration, since the terminal is owned by the user using the mobility, the terminal moves together with the mobility. Therefore, the position of the terminal is substantially the same as the position of the mobility. Therefore, when the accuracy of the terminal position information measured by a terminal is higher than the accuracy of the mobility position information measured by a mobility, the terminal position information indicating the position of the terminal is determined as the position information of the mobility, whereby the position information of the mobility can be specified with high accuracy. Since the terminal owned by the user is used, it is not necessary to install a new facility, and the cost can be suppressed.

The information processing method described above may further include acquiring, from the mobility, stop information indicating whether or not the mobility is stopped and associated with the mobility ID, in which in specifying the user ID, when the stop information indicating that the mobility is stopped is acquired, a user ID of a user who uses the mobility that is stopped may be specified based on the pairing information, and in determining the position information, terminal position information that is acquired immediately before or immediately after time when the stop information is acquired and is associated with the specified user ID may be determined as a stopping place where the mobility is stopped.

According to this configuration, when the accuracy of the terminal position information measured by a terminal is higher than the accuracy of the mobility position information measured by a mobility, the terminal position information indicating the position of the terminal is determined as the stopping place where the mobility is stopped, whereby the stopping place where the mobility is stopped can be specified with high accuracy.

In the information processing method described above, the mobility may include a position measurement unit that measures mobility position information, and accuracy of the terminal position information may be higher than accuracy of the mobility position information.

According to this configuration, since terminal position information that is higher in accuracy than mobility position information is determined as a stopping place where the mobility is stopped, the stopping place where the mobility is stopped can be specified with higher accuracy.

In the information processing method described above, the terminal position information may include an assisted global positioning system (GPS) value, and the mobility position information may include a standalone GPS value.

According to this configuration, the stopping place where the mobility is stopped can be specified using the assisted GPS value that is higher in accuracy than the standalone GPS value.

The information processing method may further include continuously acquiring, from the mobility, mobility position information indicating a position of the mobility and associated with the mobility ID, in which in determining the stopping place, whether or not terminal position information associated with the user ID having been specified has been acquired immediately before or immediately after time when the stop information is acquired may be determined, when it is determined that terminal position information associated with the user ID having been specified has been acquired immediately before or immediately after time when the stop information is acquired, the terminal position information having been acquired may be determined as a stopping place where the mobility is stopped, and when it is determined that terminal position information associated with the user ID having been specified has not been acquired immediately before or immediately after time when the stop information is acquired, mobility position information associated with a mobility ID associated with the user ID having been specified, acquired immediately before or immediately after time when the stop information is acquired may be determined as a stopping place where the mobility is stopped.

According to this configuration, when the terminal position information is acquired from the terminal immediately before or immediately after the time when the stop information is acquired, the acquired terminal position information is determined as the stopping place where the mobility is stopped. On the other hand, when the terminal position information is not acquired from the terminal immediately before or immediately after the time when the stop information is acquired, the mobility position information acquired from the mobility immediately before or immediately after the time when the stop information is acquired is determined as the stopping place where the mobility is stopped. Therefore, even when the terminal position information is not acquired from the terminal immediately before or immediately after the time when the stop information is acquired, the stopping place where the mobility is stopped can be specified using the mobility position information although the accuracy is low.

The information processing method may further include continuously acquiring, from the mobility, mobility position information indicating a position of the mobility and associated with the mobility ID, when the stop information indicating that the mobility is not stopped is acquired, calculating a distance between the terminal position information and the mobility position information, and when the distance is equal to or less than a threshold value, correcting the terminal position information to a position where a receiving antenna of a position measurement device for measuring a position of the mobility installed in the mobility exists, and storing the terminal position information having been corrected as a position of the mobility that is traveling.

According to this configuration, when the mobility is moving, the terminal moves together with the mobility. Therefore, during the movement of the mobility, the distance between the terminal position information and the mobility position information is maintained to be equal to or less than the threshold value. However, when the mobility is improperly used, for example, when the terminal is not moving together with the mobility, the distance between the terminal position information and the mobility position information becomes longer than the threshold value.

Therefore, in order to prevent the mobility from being improperly used, it is determined whether or not the distance between the terminal position information and the mobility position information is equal to or less than the threshold value. When the distance between the terminal position information and the mobility position information is equal to or less than the threshold value, it can be determined that the user who owns the terminal is properly using the mobility.

The terminal position information is corrected to a position where a receiving antenna of a position measurement device for measuring a position of the mobility installed in the mobility exists, and the corrected terminal position information is stored as a position of the mobility that is traveling. Therefore, an error between the terminal position information and the mobility position information can be corrected, and an accurate position of the mobility that is traveling can be stored.

The information processing method described above may further include, when the distance is longer than a threshold value, calculating a ratio of a distance longer than the threshold value among a plurality of distances calculated in a predetermined past period, when the ratio having been calculated is equal to or less than a threshold value, correcting the terminal position information to a position where the receiving antenna of the position measurement device for measuring a position of the mobility installed in the mobility exists, and storing the terminal position information having been corrected as a position of the mobility that is traveling, and when the ratio having been calculated is greater than the threshold value, storing the mobility position information as a position of the mobility that is traveling.

When the terminal position information or the mobility position information is temporarily not correctly measured, there is a possibility that the distance between the terminal position information and the mobility position information is determined to be temporarily longer than the threshold value. In this manner, in consideration of the case where the distance temporarily becomes longer than a threshold value, the ratio of the distance longer than the threshold value among the plurality of distances calculated in a predetermined past period is calculated, and it is determined whether or not the calculated ratio is equal to or less than a threshold value. When the calculated ratio is equal to or less than the threshold value, since it has failed to measure the accurate terminal position information or mobility position information, it can be determined that the distance temporarily becomes longer than the threshold value. On the other hand, when the calculated ratio is greater than the threshold value, a state in which the distance is longer than the threshold value continues, and there is a possibility that the terminal is not moving together with the mobility. Therefore, when the calculated ratio is greater than the threshold value, the terminal position information is not used as a mobility position, but the mobility position information is used as a position of the mobility. Therefore, an accurate position of the mobility that is traveling can be stored.

In the information processing method described above, in correcting the terminal position information, a moving direction of the terminal may be calculated based on the terminal position information acquired this time and the terminal position information acquired last time, and the terminal position information may be corrected to a position where the receiving antenna exists based on the calculated moving direction, the terminal position information acquired this time, and a distance between a position of the terminal and the receiving antenna in the mobility stored in advance.

According to this configuration, the moving direction of the terminal is calculated based on the terminal position information acquired this time and the terminal position information acquired last time. The terminal position information is corrected to a position where the receiving antenna exists based on the calculated moving direction, the terminal position information acquired this time, and a distance between a position of the terminal and the receiving antenna in the mobility stored in advance. Therefore, the terminal position information can be accurately corrected to a position where the receiving antenna exists in the mobility.

In the information processing method described above, in acquiring the pairing information, the pairing information in which the user ID is associated with the mobility ID received from the mobility by near field communication when the user starts use of the mobility may be acquired.

According to this configuration, in the terminal, the user ID can be associated with the mobility ID received by the near field communication from the mobility present in the vicinity of the terminal.

In the information processing method described above, in acquiring the pairing information, when the user reserves use of the mobility, the pairing information may be acquired from the terminal.

According to this configuration, in the terminal, when the user reserves use of mobility, the user ID and the mobility ID of the mobility reserved by the user can be associated with each other.

An information processing device according to another aspect of the present disclosure includes: a pairing information acquisition unit that acquires, from a terminal owned by a user, pairing information in which a user ID for identifying the user and a mobility ID for identifying a mobility used by the user are associated with each other, a terminal position information acquisition unit that continuously acquires, from the terminal, terminal position information indicating a position of the terminal and associated with the user ID; a specification unit that specifies a user ID of a user using the mobility that is stopped, based on the pairing information; and a determination unit that determines, as position information of the mobility, terminal position information associated with the user ID having been specified.

According to this configuration, since the terminal is owned by the user using the mobility, the terminal moves together with the mobility. Therefore, the position of the terminal is substantially the same as the position of the mobility. Therefore, when the accuracy of the terminal position information measured by a terminal is higher than the accuracy of the mobility position information measured by a mobility, the terminal position information indicating the position of the terminal is determined as the position information of the mobility, whereby the position information of the mobility can be specified with high accuracy.

Since the terminal owned by the user is used, it is not necessary to install a new facility, and the cost can be suppressed.

A non-transitory computer readable recording medium storing an information processing program according to another aspect of the present disclosure causes a computer to function to acquire, from a terminal owned by a user, pairing information in which a user ID for identifying the user and a mobility ID for identifying a mobility used by the user are associated with each other, continuously acquire, from the terminal, terminal position information indicating a position of the terminal and associated with the user ID, specify a user ID of a user using the mobility that is stopped, based on the pairing information, and determine, as position information of the mobility, terminal position information associated with the user ID having been specified.

According to this configuration, since the terminal is owned by the user using the mobility, the terminal moves together with the mobility. Therefore, the position of the terminal is substantially the same as the position of the mobility. Therefore, when the accuracy of the terminal position information measured by a terminal is higher than the accuracy of the mobility position information measured by a mobility, the terminal position information indicating the position of the terminal is determined as the position information of the mobility, whereby the position information of the mobility can be specified with high accuracy. Since the terminal owned by the user is used, it is not necessary to install a new facility, and the cost can be suppressed.

Embodiments of the present disclosure will be described below with reference to the accompanying drawings. The following embodiments are examples of embodiment of the present disclosure, and are not intended to limit the technical scope of the present disclosure.

First Embodiment

FIG. 1 is a view illustrating an overall configuration of the mobility management system in the first embodiment of the present disclosure.

The mobility management system illustrated in FIG. 1 includes a terminal 1, a mobility 2, and a server 3.

The terminal 1 is, for example, a smartphone or a tablet computer, and is owned by a user on board the mobility 2. The terminal 1 periodically transmits terminal position information indicating the position of the terminal 1 to the server 3 while the user uses the mobility 2. The terminal position information includes an assisted global positioning system (GPS) value. In the following description, the assisted GPS value is also referred to as A-GPS value.

The terminal 1 receives orbit information of a GPS satellite not from the GPS satellite but via a network 4. The data transmission rate of the network 4 is faster than the data transmission rate of the GPS satellite. Therefore, the terminal 1 can receive the orbit information with high accuracy and high speed. The terminal 1 receives, from the GPS satellite, only time information that is not easily affected by noise. Then, the terminal 1 specifies the position of the terminal 1 using the orbit information and the time information. The A-GPS value indicates the position of the terminal 1 specified using not only information from the GPS satellite but also information from the network 4.

The terminal 1 is communicably connected to the server 3 via the network 4. The network 4 is the Internet, for example. The network 4 may be an overlay network (blockchain or the like) on the Internet. In that case, the pairing information is always synchronized among the mobility 2, the server 3, and the terminal 1.

The mobility 2 is, for example, a power assisted bicycle, and can be occupied and used by an individual when moving. The mobility 2 may be occupied not by one person but by a plurality of persons such as a small commuter. The mobility 2 is shared by a plurality of users. The mobility 2 is operated by a user. The mobility 2 is lent out at a predetermined parking place (stopping place) and returned at the predetermined parking place. A plurality of parking places are provided in an urban area. In the parking place, a plurality of mobilities 2 can be parked and the mobilities 2 can be charged. The parking place where the mobility 2 is lent out and the parking place where the mobility 2 is returned are not necessarily the same. The mobility 2 is communicably connected to the server 3 via the network 4.

The mobility 2 periodically transmits, by near field communication, a mobility ID for identifying the mobility 2. The near field communication is, for example, Bluetooth Low Energy (BLE), which is one of the Bluetooth (registered trademark) communication modes. The mobility 2 broadcasts the mobility ID by near field communication. The mobility 2 broadcasts the mobility ID, for example, every second. The signal reach distance of the near field communication is 10 meters, for example. The terminal 1 receives the mobility ID transmitted by the mobility 2.

For example, a plurality of mobilities stopped at the same parking place broadcast the mobility ID by near field communication. When the terminal 1 enters the signal reach distance of near field communication of the plurality of mobilities, the terminal 1 receives a plurality of mobility IDs broadcasted by the plurality of mobilities. The terminal 1 presents the plurality of received mobility IDs to the user, and receives selection of a desired mobility ID by the user from among the plurality of mobility IDs. This allows the user to select, from among the plurality of mobilities stopped at the parking place, a mobility to be used from now. The terminal 1 transmits pairing information in which a user ID and a mobility are associated with each other to the server 3.

The mobility 2 periodically transmits mobility position information indicating the position of the mobility 2 to the server 3 while the user uses the mobility 2. The mobility position information includes a standalone GPS value. Note that, in the following description, the standalone GPS value is also referred to as S-GPS value.

The mobility 2 specifies the position of the mobility 2 using only information from the GPS satellite. The S-GPS value indicates the position of the mobility 2 specified using only information from the GPS satellite. Therefore, the accuracy of the A-GPS value is higher than the accuracy of the S-GPS value.

The mobility 2 may be anon-power assisted bicycle. The mobility 2 may be an electric vehicle, an electric motorcycle, an automobile including an internal combustion engine, or a motorcycle including an internal combustion engine. The mobility 2 needs not be shared by a plurality of persons, and may be used only by a specific person. The mobility 2 may be simultaneously used by a plurality of persons.

The server 3 is, for example, a web server. The server 3 receives, from the terminal 1, terminal position information indicating the position of the terminal 1. The server 3 receives, from the mobility 2, mobility position information indicating the position of the mobility 2. The server 3 receives, from the mobility 2, stop information indicating whether or not the mobility 2 is stopped.

Upon receiving the stop information indicating that the mobility 2 is stopped, the server 3 determines, as the stopping place where the mobility 2 is stopped, the terminal position information of the terminal 1 received immediately before or immediately after the time when the stop information is received.

Figure 2:
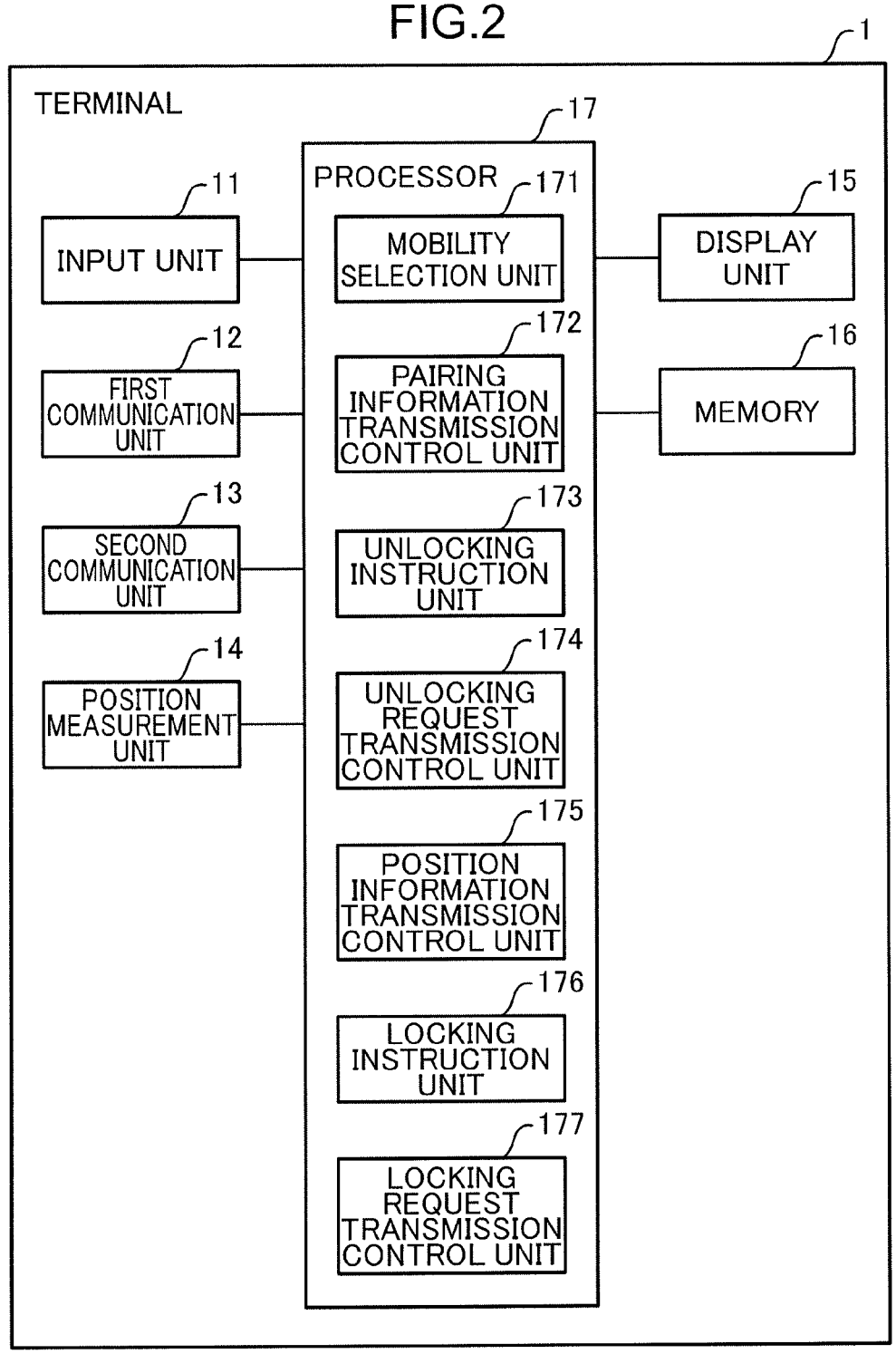
FIG. 2 is a view illustrating an example of a configuration of a terminal in the first embodiment of the present disclosure.

FIG. 2 is a view illustrating an example of the configuration of the terminal 1 in the first embodiment of the present disclosure.

The terminal 1 illustrated in FIG. 2 includes an input unit 11, a first communication unit 12, a second communication unit 13, a position measurement unit 14, a display unit 15, a memory 16, and a processor 17.

The input unit 11 is, for example, a touchscreen, and receives various types of information input by the user.

The first communication unit 12 receives, by near field communication, the mobility ID broadcasted by the mobility 2.

The second communication unit 13, via the network 4, transmits various types of information to the server 3 and receives various types of information from the server 3. The second communication unit 13 receives the orbit information of the GPS satellite from the A-GPS server via the network 4. The second communication unit 13 is connected to the network 4 via a base station in the vicinity of the terminal 1. Therefore, the A-GPS server selects a GPS satellite that can be received by the terminal 1 from the position of the base station, and transmits orbit information of the selected GPS satellite to the terminal 1.

The position measurement unit 14 measures the position of the terminal 1 at a predetermined sampling cycle. The predetermined sampling cycle is, for example, 5 seconds or 10 seconds. The position of the terminal 1 is an A-GPS value. The position measurement unit 14 measures the current position of the terminal 1 by using time information from the GPS satellite received by an antenna not illustrated and orbit information of the GPS satellite received by the second communication unit 13. The current position is represented by latitude and longitude. As described above, in a place with poor radio wave conditions such as around a lower part of a building, measurement accuracy of the current position may deteriorate due to occurrence of a time difference in a GPS signal or deterioration in an S/N ratio of a GPS signal. However, the position measurement unit 14 can specify the position of the terminal 1 with high accuracy by receiving the orbit information from the A-GPS server via the network 4.

The display unit 15 is, for example, a liquid crystal display device, and displays information regarding an available mobility present in the vicinity of the terminal 1.

The memory 16 is, for example, a storage device capable of storing various types of information such as a RAM, an SSD, or a flash memory. The memory 16 stores in advance a user ID for identifying the user of the terminal 1.

The processor 17 is, for example, a central processing unit (CPU). The processor 17 implements a mobility selection unit 171, a pairing information transmission control unit 172, an unlocking instruction unit 173, an unlocking request transmission control unit 174, a position information transmission control unit 175, a locking instruction unit 176, and a locking request transmission control unit 177.

The mobility selection unit 171 causes the display unit 15 to display the mobility ID received by the first communication unit 12, and receives selection of a desired mobility ID by the user. The display unit 15 displays the mobility ID of the mobility 2 present in the vicinity of the terminal 1. The input unit 11 receives selection by the user of the mobility ID corresponding to the mobility 2 to be used.

The pairing information transmission control unit 172 causes the second communication unit 13 to transmit pairing information in which the user ID stored in the memory 16 is associated with the mobility ID selected by the user. The second communication unit 13 transmits the pairing information to the server 3.

In the first embodiment, the user ID may be identification information for individually identifying the terminal 1, or may be identification information for individually identifying the user who uses the terminal 1.

The unlocking instruction unit 173 receives an instruction by the user for unlocking the mobility 2. The unlocking instruction unit 173 causes the display unit 15 to display the unlocking button for receiving an instruction by the user for unlocking the mobility 2. The display unit 15 displays the unlocking button for receiving an instruction by the user for unlocking the mobility 2. The input unit 11 receives pressing of the unlocking button by the user for unlocking the mobility 2. When unlocking the mobility 2, the user touches the unlocking button displayed on the display unit 15.

The unlocking request transmission control unit 174 causes the first communication unit 12 to transmit an unlocking request for unlocking the mobility 2. When the unlocking button displayed on the display unit 15 is touched, the unlocking request transmission control unit 174 causes the first communication unit 12 to transmit the unlocking request for unlocking the mobility 2. The first communication unit 12 transmits the unlocking request to the mobility 2. The unlocking request includes the user ID.

The position information transmission control unit 175 causes the second communication unit 13 to transmit terminal position information indicating the position of the terminal 1 measured by the position measurement unit 14. At this time, the position information transmission control unit 175 causes the second communication unit 13 to transmit the user ID stored in advance in the memory 16 and the terminal position information measured by the position measurement unit 14. The second communication unit 13 intermittently transmits the user ID and the terminal position information to the server 3. The second communication unit 13 transmits the user ID and the terminal position information to the server 3 at a predetermined sampling cycle. The sampling cycle in which the terminal position information is transmitted is the same as the sampling cycle in which the terminal position information is measured.

The locking instruction unit 176 receives an instruction by the user for locking the mobility 2. The locking instruction unit 176 causes the display unit 15 to display a locking button for receiving an instruction by the user for locking the mobility 2. The display unit 15 displays the locking button for receiving an instruction by the user for locking the mobility 2. The input unit 11 receives pressing of the locking button by the user for locking the mobility 2. When locking the mobility 2, the user touches the locking button displayed on the display unit 15.

The locking request transmission control unit 177 causes the first communication unit 12 to transmit a locking request for locking the mobility 2. When the locking button displayed on the display unit 15 is touched, the locking request transmission control unit 177 causes the first communication unit 12 to transmit the locking request for locking the mobility 2. The first communication unit 12 transmits the locking request to the mobility 2. The locking request includes the user ID.

The first communication unit 12 may transmit a returning request separately from the locking request. The processor 17 may include a returning instruction unit that receives an instruction by the user for returning the mobility 2. The returning instruction unit may cause the display unit 15 to display a returning button. The returning button may receive a returning instruction of the mobility 2 by the user after locking.

In the first embodiment, the terminal 1 receives, by near field communication, the mobility ID broadcasted by the mobility 2, but the present disclosure is not particularly limited to this. A two-dimensional code representing a mobility ID may be attached to the mobility 2. The terminal 1 may further include a camera that reads a two-dimensional code. The terminal 1 may acquire the mobility ID of the mobility 2 by reading a two-dimensional code attached to the mobility 2.

Figure 3:
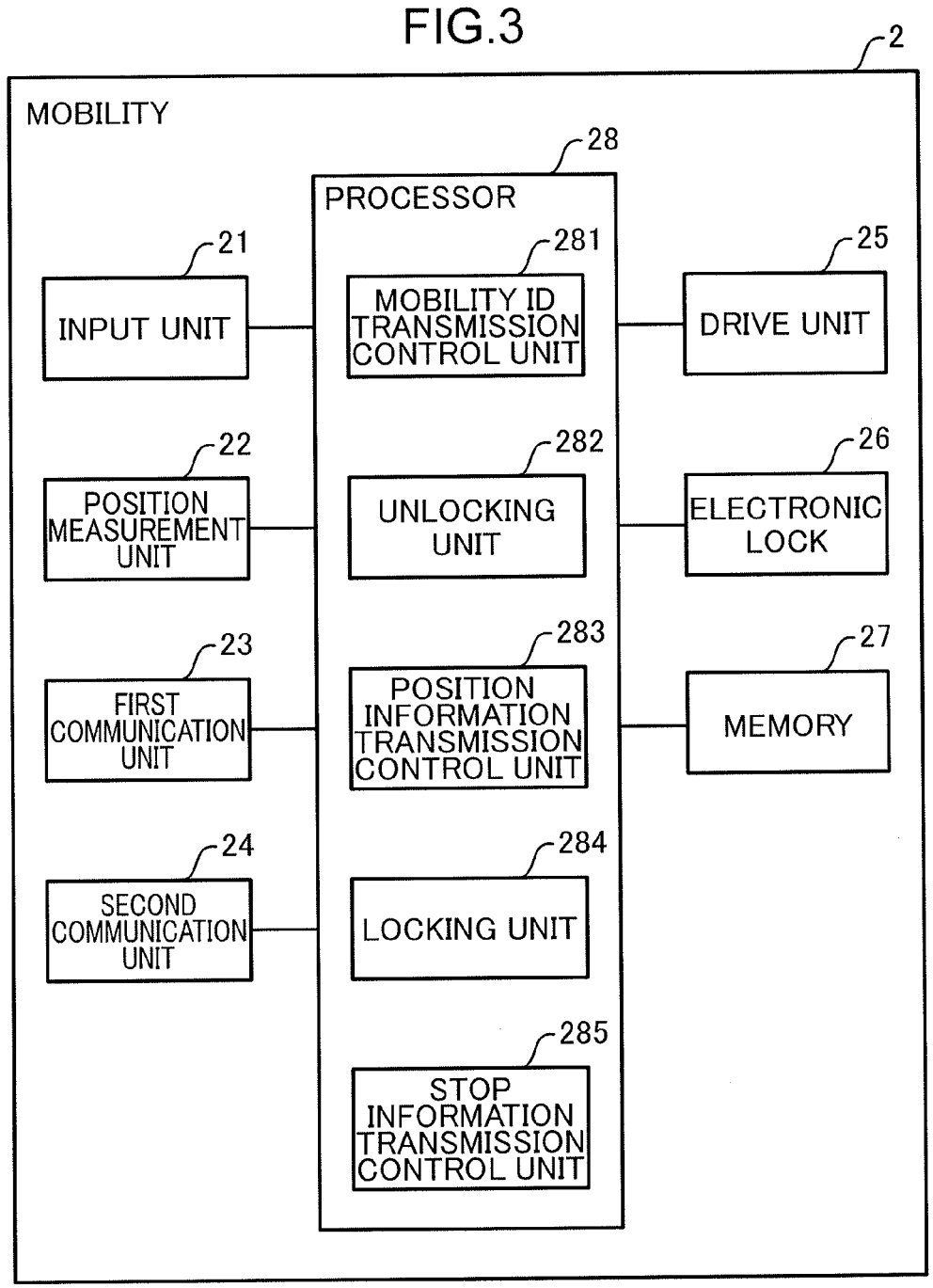
FIG. 3 is a view illustrating an example of a configuration of a mobility in the first embodiment of the present disclosure.

FIG. 3 is a view illustrating an example of the configuration of the mobility 2 in the first embodiment of the present disclosure.

The mobility 2 illustrated in FIG. 3 includes an input unit 21, a position measurement unit 22, a first communication unit 23, a second communication unit 24, a drive unit 25, an electronic lock 26, a memory 27, and a processor 28.

The input unit 21 receives a driving operation of the mobility 2 by the user.

The position measurement unit 22 measures the position of the mobility 2 at a predetermined sampling cycle. The predetermined sampling cycle is, for example, 5 seconds or 10 seconds. The position of the mobility 2 is an S-GPS value. The position measurement unit 22 measures the current position of the mobility 2 by using time information and orbit information from the GPS satellite received by an antenna not illustrated. The current position is represented by latitude and longitude. As described above, the position information of the mobility 2 is measured using only a signal from the GPS satellite. Therefore, the accuracy of the position information of the mobility 2 is inferior to the accuracy of the position information of the terminal 1.

The first communication unit 23 periodically broadcasts, by near field communication, a mobility ID for identifying the mobility 2. The first communication unit 23 receives the unlocking request and the locking request transmitted by the terminal 1.

The second communication unit 24, via the network 4, transmits various types of information to the server 3 and receives various types of information from the server 3.

The drive unit 25 is, for example, an electric motor, and rotates wheels of the mobility 2 by driving the electric motor.

The electronic lock 26 is electrically locked and unlocked.

The memory 27 is, for example, a storage device capable of storing various types of information such as a RAM, an SSD, or a flash memory. The memory 27 stores in advance a mobility ID for identifying the mobility 2.

The processor 28 is, for example, a CPU. The processor 28 includes a mobility ID transmission control unit 281, an unlocking unit 282, a position information transmission control unit 283, a locking unit 284, and a stop information transmission control unit 285.

The mobility ID transmission control unit 281 causes the first communication unit 23 to periodically transmit a mobility ID for identifying the mobility 2.

When the first communication unit 23 receives an unlocking request, the unlocking unit 282 transmits, to the server 3 via the second communication unit 24, the user ID included in the unlocking request and the mobility ID stored in the memory 27. When the second communication unit 24 receives an unlocking signal permitting unlocking, the unlocking unit 282 unlocks the electronic lock 26 of the mobility 2.

The position information transmission control unit 283 causes the second communication unit 24 to transmit mobility position information indicating the position of the mobility 2 measured by the position measurement unit 22. At this time, the position information transmission control unit 283 causes the second communication unit 24 to transmit the mobility ID stored in advance in the memory 27 and the mobility position information measured by the position measurement unit 22. The second communication unit 24 intermittently transmits the mobility ID and the mobility position information to the server 3. The second communication unit 24 transmits the mobility ID and the mobility position information to the server 3 at a predetermined sampling cycle. The sampling cycle in which the mobility position information is transmitted is the same as the sampling cycle in which the mobility position information is measured.

When the first communication unit 23 receives a locking request, the locking unit 284 locks the electronic lock 26 of the mobility 2.

The stop information transmission control unit 285 causes the second communication unit 24 to transmit stop information indicating whether or not the mobility 2 is stopped. The second communication unit 24 transmits the stop information to the server 3.

When the electronic lock 26 is locked by the locking unit 284, the stop information transmission control unit 285 determines that the mobility 2 is stopped, and generates stop information indicating that the mobility 2 is stopped. When the electronic lock 26 is not locked by the locking unit 284, the stop information transmission control unit 285 determines that the mobility 2 is not stopped, and generates stop information indicating that the mobility 2 is not stopped.

When the speed of the mobility 2 is 0, the stop information transmission control unit 285 may determine that the mobility 2 is stopped, and generate stop information indicating that the mobility 2 is stopped. When the engine of the mobility 2 is stopped, the stop information transmission control unit 285 may determine that the mobility 2 is stopped, and generate stop information indicating that the mobility 2 is stopped. In this case, the mobility 2 is, for example, an automobile or a motorcycle. Upon receiving a returning request, the stop information transmission control unit 285 may determine that the mobility 2 is stopped, and generate stop information indicating that the mobility 2 is stopped.

In the first embodiment, the terminal 1 receives unlocking and locking of the mobility 2, but the present disclosure is not particularly limited to this, and the mobility 2 may receive unlocking and locking of the mobility 2. In this case, the input unit 21 may receive the unlocking operation and the locking operation of the mobility 2 by the user. For example, the input unit 21 may include a numeric keypad, an unlocking button, and a locking button. The numeric keypad receives input of a password for unlocking the mobility 2. The password is transmitted from the server 3 to the terminal 1 and presented to the user. The unlocking button receives the unlocking operation of the mobility 2 by the user after inputting the password. The locking button receives the locking operation of the mobility 2 by the user. The input unit 21 may receive a returning operation separately from the locking operation. The input unit 21 may include the returning button. The returning button may receive the returning operation of the mobility 2 by the user after locking.

Figure 4:
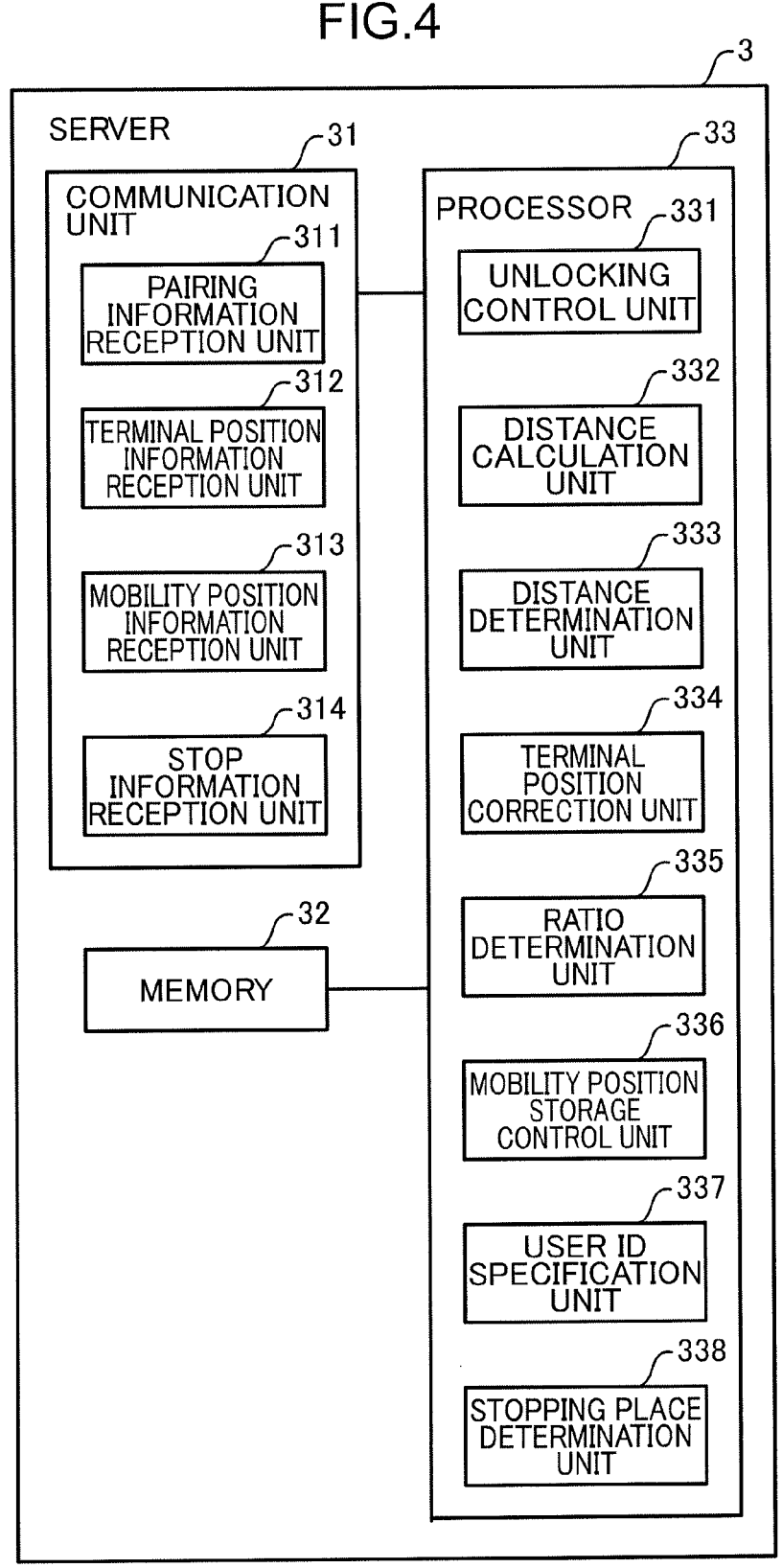
FIG. 4 is a view illustrating an example of a configuration of a server in the first embodiment of the present disclosure.

FIG. 4 is a view illustrating an example of the configuration of the server 3 in the first embodiment of the present disclosure.

The server 3 illustrated in FIG. 4 includes a communication unit 31, a memory 32, and a processor 33.

The communication unit 31 includes a pairing information reception unit 311, a terminal position information reception unit 312, a mobility position information reception unit 313, and a stop information reception unit 314.

The pairing information reception unit 311 acquires, from the terminal 1 owned by the user, pairing information in which the user ID for identifying the user and the mobility ID for identifying the mobility 2 used by the user are associated with each other. The pairing information reception unit 311 receives the pairing information transmitted by the terminal 1. The pairing information reception unit 311 acquires pairing information in which the user ID is associated with the mobility ID received from the mobility 2 by near field communication when the user starts using the mobility 2.

The terminal position information reception unit 312 continuously acquires, from the terminal 1, terminal position information indicating the position of the terminal 1 and associated with the user ID. The terminal position information reception unit 312 receives the user ID and the terminal position information transmitted by the terminal 1.

The mobility position information reception unit 313 continuously acquires, from the mobility 2, mobility position information indicating the position of the mobility 2 and associated with the mobility ID. The mobility position information reception unit 313 receives the mobility ID and the mobility position information transmitted by the mobility 2.

The stop information reception unit 314 acquires, from the mobility 2, stop information indicating whether or not the mobility 2 is stopped and associated with the mobility ID. The stop information reception unit 314 receives the stop information transmitted by the mobility 2.

The memory 32 is, for example, a semiconductor memory or a hard disk drive. The memory 32 stores the pairing information received by the pairing information reception unit 311. The memory 32 stores, together with the pairing information, a history of the terminal position information associated with the user ID and a history of the mobility position information associated with the mobility ID.

The processor 33 is, for example, a CPU. The processor 33 includes an unlocking control unit 331, a distance calculation unit 332, a distance determination unit 333, a terminal position correction unit 334, a ratio determination unit 335, a mobility position storage control unit 336, a user ID specification unit 337, and a stopping place determination unit 338.

When receiving a user ID and a mobility ID, the unlocking control unit 331 determines whether or not the user ID and the mobility ID that have been received match the user ID and the mobility ID that are included in the pairing information. When determining that the user ID and the mobility ID having been received match the user ID and mobility ID included in the pairing information, the unlocking control unit 331 causes the communication unit 31 to transmit an unlocking signal. The communication unit 31 transmits the unlocking signal to the mobility 2.

When the stop information indicating that the mobility 2 is not stopped is acquired, the distance calculation unit 332 calculates the distance between the terminal position information and the mobility position information. The distance is a Euclidean distance. The distance calculation unit 332 stores the calculated distance into the memory 32 in association with the pairing information.

The distance determination unit 333 determines whether or not the distance calculated by the distance calculation unit 332 is equal to or less than a threshold value.

When the distance is equal to or less than the threshold value, the terminal position correction unit 334 corrects the terminal position information to the position where the receiving antenna of the position measurement unit 22 for measuring the position of the mobility 2 installed in the mobility 2 exists.

First, the terminal position correction unit 334 calculates the moving direction of the terminal 1 based on the terminal position information acquired this time and the terminal position information acquired last time. Next, the terminal position correction unit 334 corrects the terminal position information to the position where the receiving antenna exists based on the calculated moving direction, the terminal position information acquired this time, and the distance between the position of the terminal 1 and the receiving antenna in the mobility 2 stored in advance.

When the distance is longer than the threshold value, the ratio determination unit 335 calculates the ratio of the distance longer than the threshold value among a plurality of distances calculated in the predetermined past period. The ratio determination unit 335 determines whether or not the calculated ratio is equal to or less than the threshold value. When it is determined that the calculated ratio is equal to or less than the threshold value, the terminal position correction unit 334 corrects the terminal position information to the position where the receiving antenna of the position measurement unit 22 for measuring the position of the mobility 2 installed in the mobility 2 exists.

The mobility position storage control unit 336 stores, as the position of the mobility 2 that is traveling, the terminal position information corrected by the terminal position correction unit 334. When it is determined that the calculated ratio is greater than the threshold value, the mobility position storage control unit 336 stores the mobility position information as the position of the mobility 2 that is traveling.

The user ID specification unit 337 specifies the user ID of the user using the stopped mobility 2 based on the pairing information. When the stop information indicating that the mobility 2 is stopped is acquired, the user ID specification unit 337 specifies the user ID of the user using the stopped mobility 2 based on the pairing information.

The stopping place determination unit 338 determines, as the position information of the mobility 2, the terminal position information associated with the specified user ID. The stopping place determination unit 338 determines, as the stopping place where the mobility 2 is stopped, the terminal position information that is acquired immediately before or immediately after time when the stop information is acquired and is associated with the specified user ID.

The stopping place determination unit 338 determines whether or not the terminal position information associated with the specified user ID has been acquired immediately before or immediately after time when the stop information is acquired. When determining that the terminal position information associated with the specified user ID has been acquired immediately before or immediately after time when the stop information is acquired, the stopping place determination unit 338 determines the acquired terminal position information as the stopping place where the mobility 2 is stopped. On the other hand, when determining that the terminal position information associated with the specified user ID has not been acquired immediately before or immediately after time when the stop information is acquired, the stopping place determination unit 338 determines, as the stopping place where the mobility 2 is stopped, the mobility position information associated with the mobility ID associated with the specified user ID and acquired immediately before or immediately after time when the stop information is acquired.

Next, the operation of the terminal 1 in the first embodiment of the present disclosure will be described.

Figure 5:
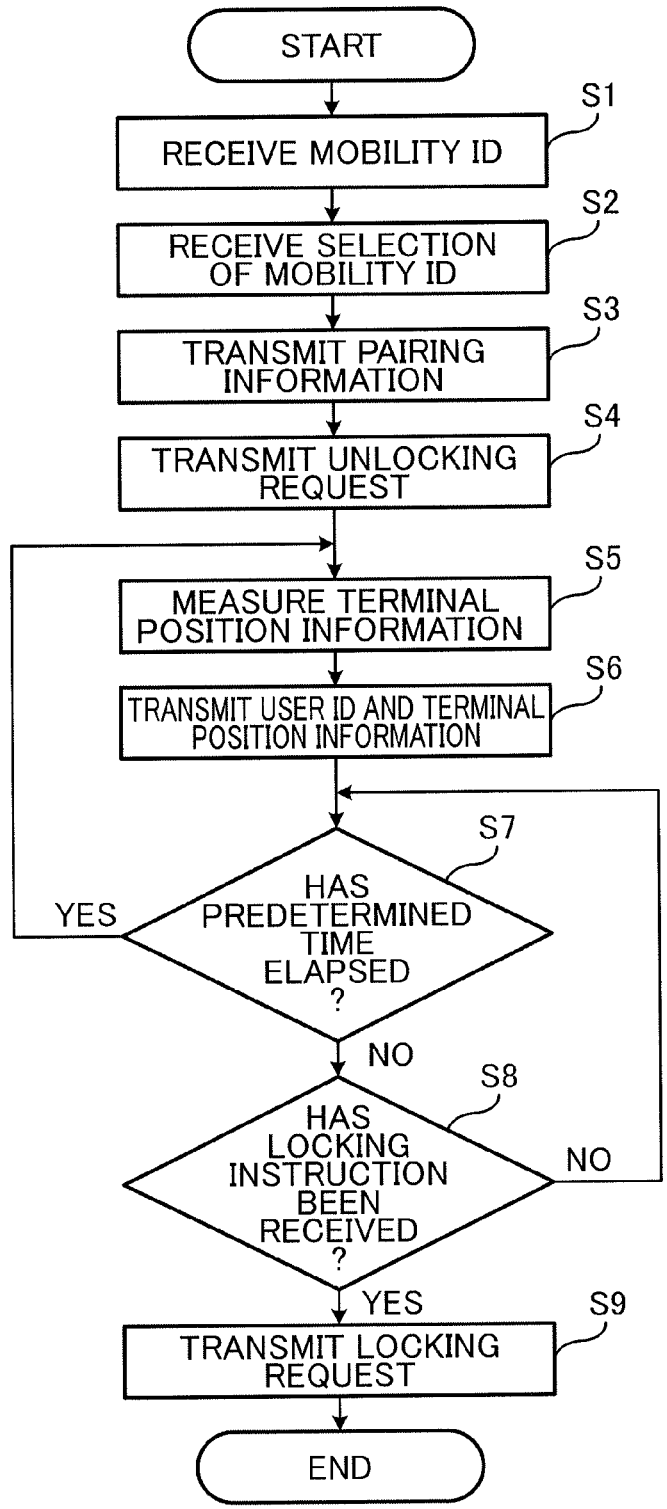
FIG. 5 is a flowchart for describing an operation of the terminal in the first embodiment of the present disclosure.

FIG. 5 is a flowchart for describing the operation of the terminal 1 in the first embodiment of the present disclosure.

First, in step S1, the first communication unit 12 receives, by near field communication, the mobility ID broadcasted by the mobility 2. In a case where a plurality of mobilities exist in a receivable range by near field communication, the first communication unit 12 receives each mobility ID from the plurality of mobilities.

Next, in step S2, the mobility selection unit 171 causes the display unit 15 to display the mobility ID received by the first communication unit 12, and receives selection of a desired mobility ID by the user. In a case where a plurality of mobilities exist in a receivable range by near field communication, the mobility selection unit 171 causes the display unit 15 to display the plurality of mobility IDs corresponding to the plurality of respective mobilities. The user selects the mobility ID corresponding to the mobility to be used among the plurality of mobility IDs. In the description of the first embodiment, the mobility ID of the mobility 2 is selected.

Next, in step S3, the pairing information transmission control unit 172 causes the second communication unit 13 to transmit pairing information in which the user ID stored in advance in the memory 16 and the mobility ID selected by the user are associated with each other.

Next, in step S4, the unlocking request transmission control unit 174 causes the first communication unit 12 to transmit an unlocking request for unlocking the mobility 2. The first communication unit 12 transmits the unlocking request to the mobility 2. Here, the unlocking instruction unit 173 receives an instruction by the user for unlocking the mobility 2. The unlocking instruction unit 173 may receive a password for unlocking the mobility 2 from the server 3, and cause the display unit 15 to display the received password. The unlocking instruction unit 173 may receive input of the password from the user. The unlocking request transmission control unit 174 may cause the first communication unit 12 to transmit an unlocking request including the input password. Alternatively, when the input unit for inputting the password is provided in the mobility 2, the user may directly input the password in the input unit provided in the mobility 2.

Next, in step S5, the position measurement unit 14 measures terminal position information indicating the current position of the terminal 1. The terminal position information is, for example, an A-GPS value.

Next, in step S6, the position information transmission control unit 175 causes the second communication unit 13 to transmit the user ID stored in advance in the memory 16 and the terminal position information measured by the position measurement unit 14. The second communication unit 13 transmits the user ID and the terminal position information to the server 3.

Next, in step S7, the position information transmission control unit 175 determines whether or not a predetermined time has elapsed since the transmission of the user ID and the terminal position information. The predetermined time is a sampling cycle for measuring terminal position information. Here, when it is determined that the predetermined time has elapsed since the transmission of the user ID and the terminal position information (YES in step S7), the processing returns to step S5.

On the other hand, when it is determined that the predetermined time has not elapsed since the transmission of the user ID and the terminal position information (NO in step S7), the locking instruction unit 176 determines whether or not the locking instruction by the user for locking the mobility 2 has been received. Here, when it is determined that the locking instruction has not been received (NO in step S8), the processing returns to step S7.

On the other hand, when it is determined that the lock instruction has been received (YES in step S8), the locking request transmission control unit 177 causes in step S9 the first communication unit 12 to transmit a locking request for locking the mobility 2. The first communication unit 12 transmits the locking request to the mobility 2.

Next, the operation of the mobility 2 in the first embodiment of the present disclosure will be described.

Figure 6:
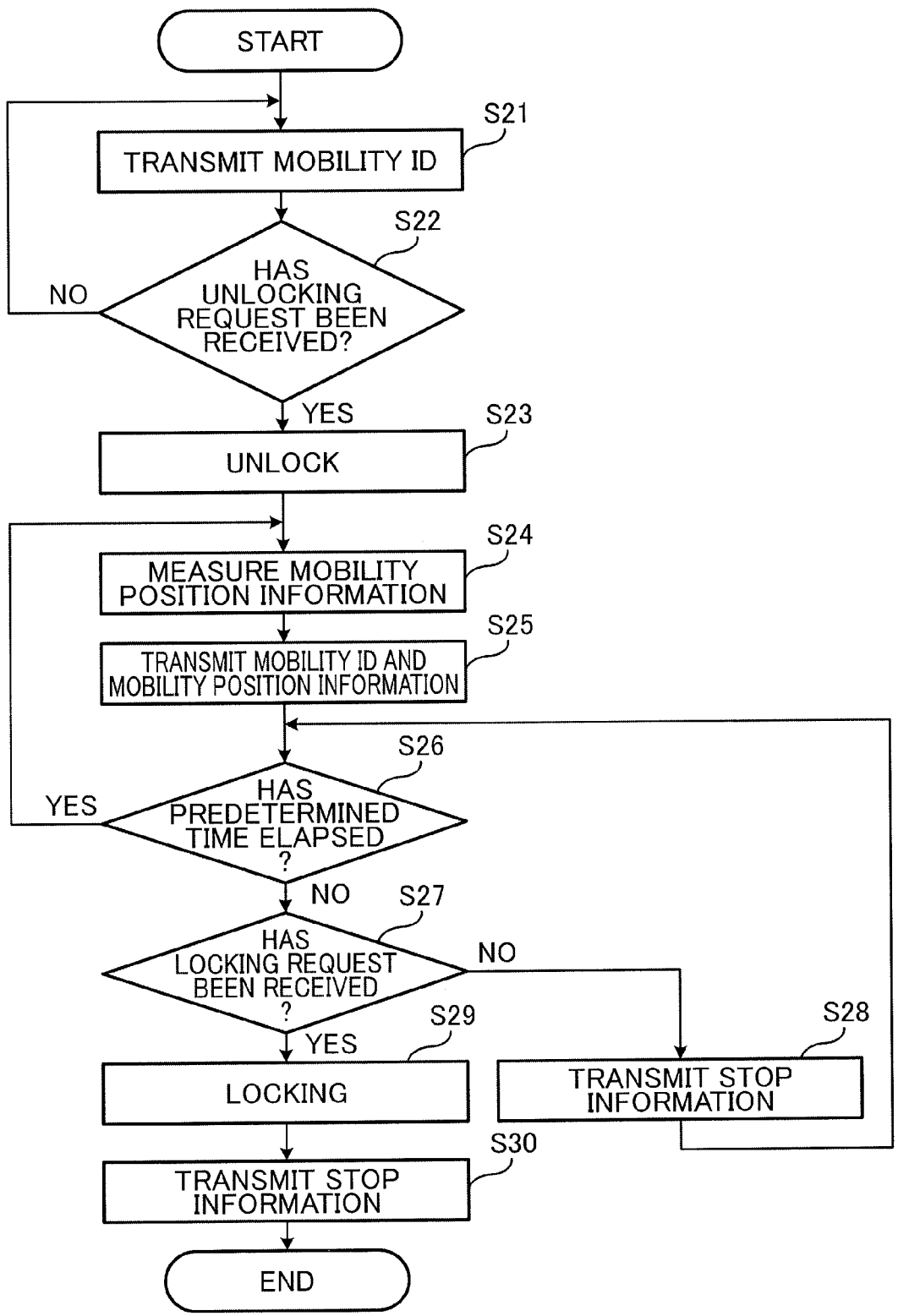
FIG. 6 is a flowchart for describing an operation of the mobility in the first embodiment of the present disclosure.

FIG. 6 is a flowchart for describing the operation of the mobility 2 in the first embodiment of the present disclosure.

First, in step S21, the first communication unit 23 broadcasts a mobility ID for identifying the mobility 2 by near field communication.

Next, in step S22, the unlocking unit 282 determines whether or not the first communication unit 23 has received the unlocking request. The first communication unit 23 receives the unlocking request transmitted by the terminal 1. Here, when it is determined that the unlocking request has not been received (NO in step S22), the processing returns to step S21.

On the other hand, when it is determined that the unlocking request has been received (YES in step S22), the unlocking unit 282 unlocks the electronic lock 26 of the mobility 2 in step S23.

Next, in step S24, the position measurement unit 22 measures the mobility position information indicating the current position of the mobility 2. The mobility position information is, for example, an S-GPS value.

Next, in step S25, the position information transmission control unit 283 causes the second communication unit 24 to transmit the mobility ID stored in advance in the memory 27 and the mobility position information measured by the position measurement unit 22. The second communication unit 24 transmits the mobility ID and the mobility position information to the server 3.

Next, in step S26, the position information transmission control unit 283 determines whether or not a predetermined time has elapsed since the transmission of the mobility ID and the mobility position information. The predetermined time is a sampling cycle for measuring mobility position information. Here, when it is determined that the predetermined time has elapsed since the transmission of the mobility ID and the mobility position information (YES in step S26), the processing returns to step S24.

On the other hand, when it is determined that the predetermined time has not elapsed since the transmission of the mobility ID and the mobility position information (NO in step S26), the locking unit 284 determines in step S27 whether or not the first communication unit 23 has received the locking request. The first communication unit 23 receives the locking request transmitted by the terminal 1. Here, when it is determined that the locking request has not been received (NO in step S27), the stop information transmission control unit 285 determines in step S28 that the mobility 2 is not stopped, generates stop information indicating that the mobility 2 is not stopped, and causes the second communication unit 24 to transmit the generated stop information. The second communication unit 24 transmits, to the server 3, the stop information indicating that the mobility 2 is not stopped. Thereafter, the processing returns to step S26.

On the other hand, when it is determined that the locking request has been received (YES in step S27), the locking unit 284 locks the electronic lock 26 of the mobility 2 in step S29.

Next, in step S30, the stop information transmission control unit 285 determines that the mobility 2 is stopped, generates stop information indicating that the mobility 2 is stopped, and causes the second communication unit 24 to transmit the generated stop information. The second communication unit 24 transmits, to the server 3, the stop information indicating that the mobility 2 is stopped.

Next, the operation of the server 3 in the first embodiment of the present disclosure will be described.

Figure 7:
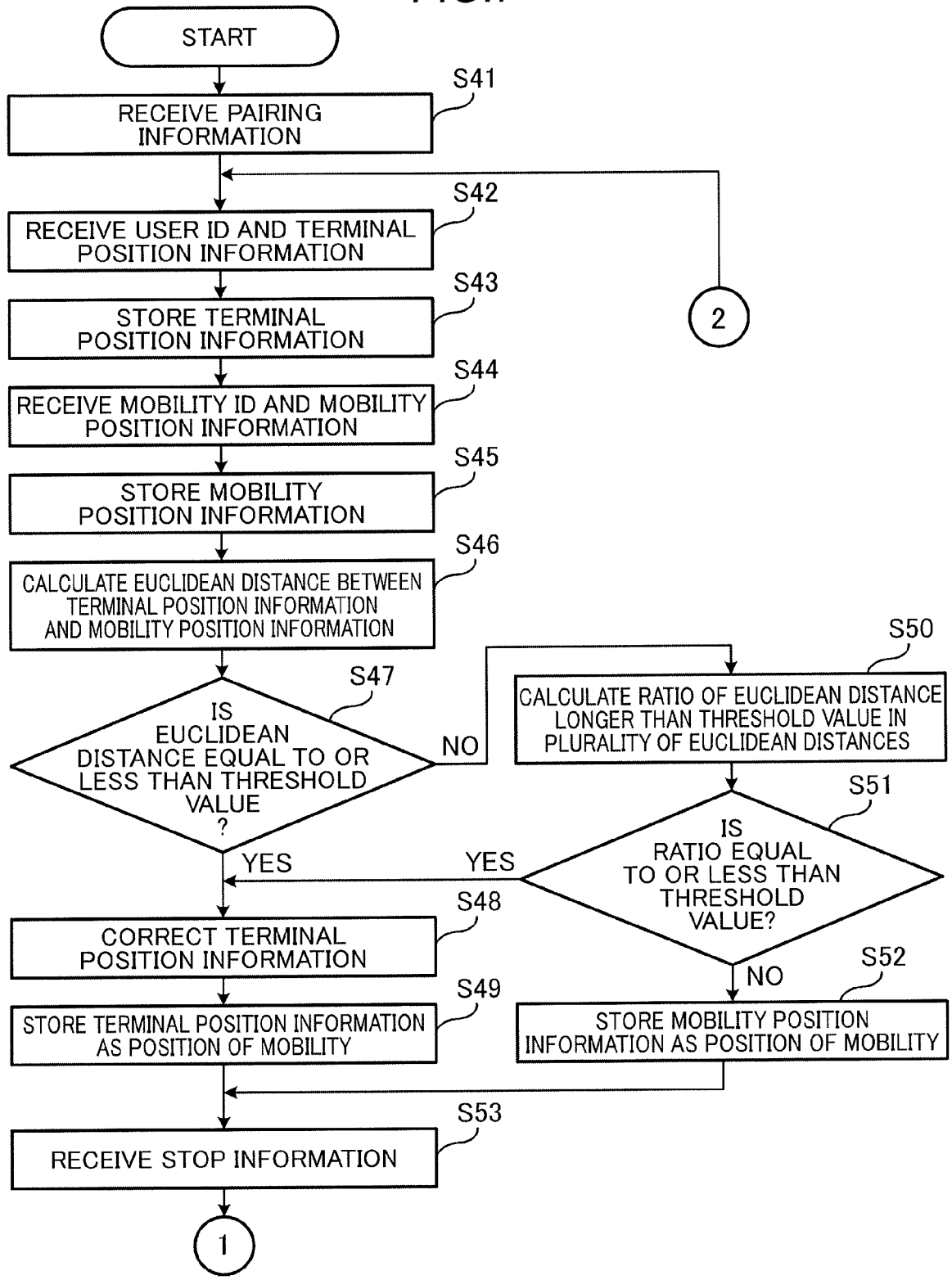
FIG. 7 is a first flowchart for describing an operation of the server in the first embodiment of the present disclosure.
Figure 8:
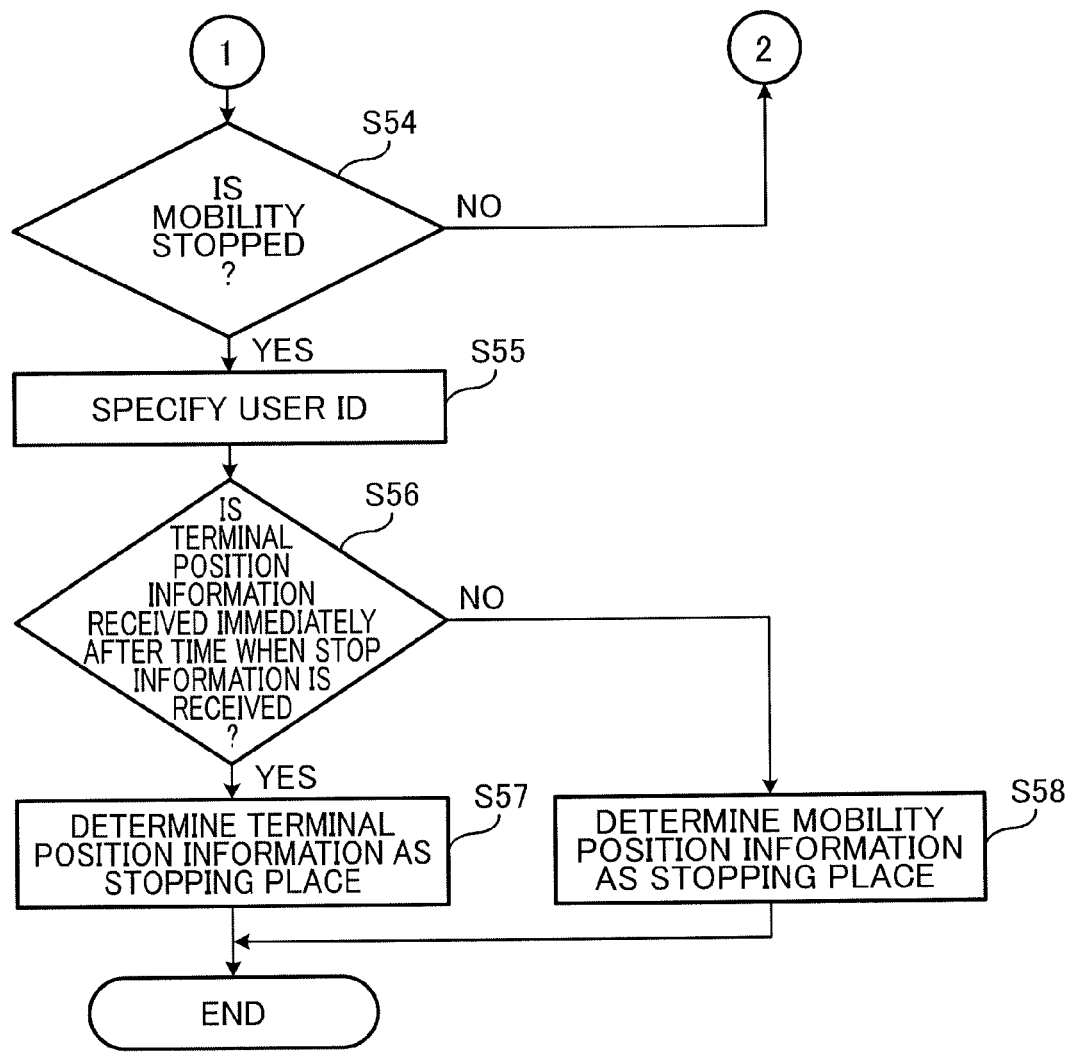
FIG. 8 is a second flowchart for describing the operation of the server in the first embodiment of the present disclosure.

FIG. 7 is the first flowchart for describing the operation of the server 3 in the first embodiment of the present disclosure, and FIG. 8 is the second flowchart for describing the operation of the server 3 in the first embodiment of the present disclosure.

First, in step S41, the pairing information reception unit 311 receives the pairing information transmitted by the terminal 1. The pairing information reception unit 311 stores the received pairing information into the memory 32.

Next, in step S42, the terminal position information reception unit 312 receives the user ID and the terminal position information transmitted by the terminal 1.

Next, in step S43, the terminal position information reception unit 312 stores the received terminal position information into memory 32 in association with the pairing information.

Next, in step S44, the mobility position information reception unit 313 receives the mobility ID and the mobility position information transmitted by the mobility 2.

Next, in step S45, the mobility position information reception unit 313 stores the received mobility position information into the memory 32 in association with the pairing information.

Next, in step S46, the distance calculation unit 332 calculates a Euclidean distance between the terminal position information and the mobility position information. Since the terminal position information is an A-GPS value and the mobility position information is an S-GPS value, the distance calculation unit 332 calculates the Euclidean distance between the A-GPS value and the S-GPS value. The distance calculation unit 332 stores the calculated Euclidean distance into the memory 32 in association with the pairing information.

Next, in step S47, the distance determination unit 333 determines whether or not the Euclidean distance calculated by the distance calculation unit 332 is equal to or less than a threshold value.

During movement of the mobility 2, the terminal 1 moves together with the mobility 2. Therefore, during the movement of the mobility 2, the Euclidean distance between the A-GPS value of the terminal 1 and the S-GPS value of the mobility 2 is maintained to be equal to or less than the threshold value. However, when the mobility 2 is improperly used, for example, when the terminal 1 is not moving together with the mobility 2, the Euclidean distance between the A-GPS value of the terminal 1 and the S-GPS value of the mobility 2 becomes longer than the threshold value. Therefore, in order to prevent the mobility 2 from being improperly used, it is determined whether or not the Euclidean distance between the A-GPS value of the terminal 1 and the S-GPS value of the mobility 2 is equal to or less than the threshold value. The threshold value is, for example, 10 meters. When the Euclidean distance between the A-GPS value of the terminal 1 and the S-GPS value of the mobility 2 is equal to or less than the threshold value, it can be determined that the user who owns the terminal 1 properly uses the mobility 2.

Here, when it is determined that the Euclidean distance is equal to or less than the threshold value (YES in step S47), the terminal position correction unit 334 corrects in step S48 the terminal position information to the position where the receiving antenna of the position measurement unit 22 for measuring the position of the mobility 2 installed in the mobility 2 exists.

Here, the correction method of terminal position information in the first embodiment will be described in more detail.

Figure 9:
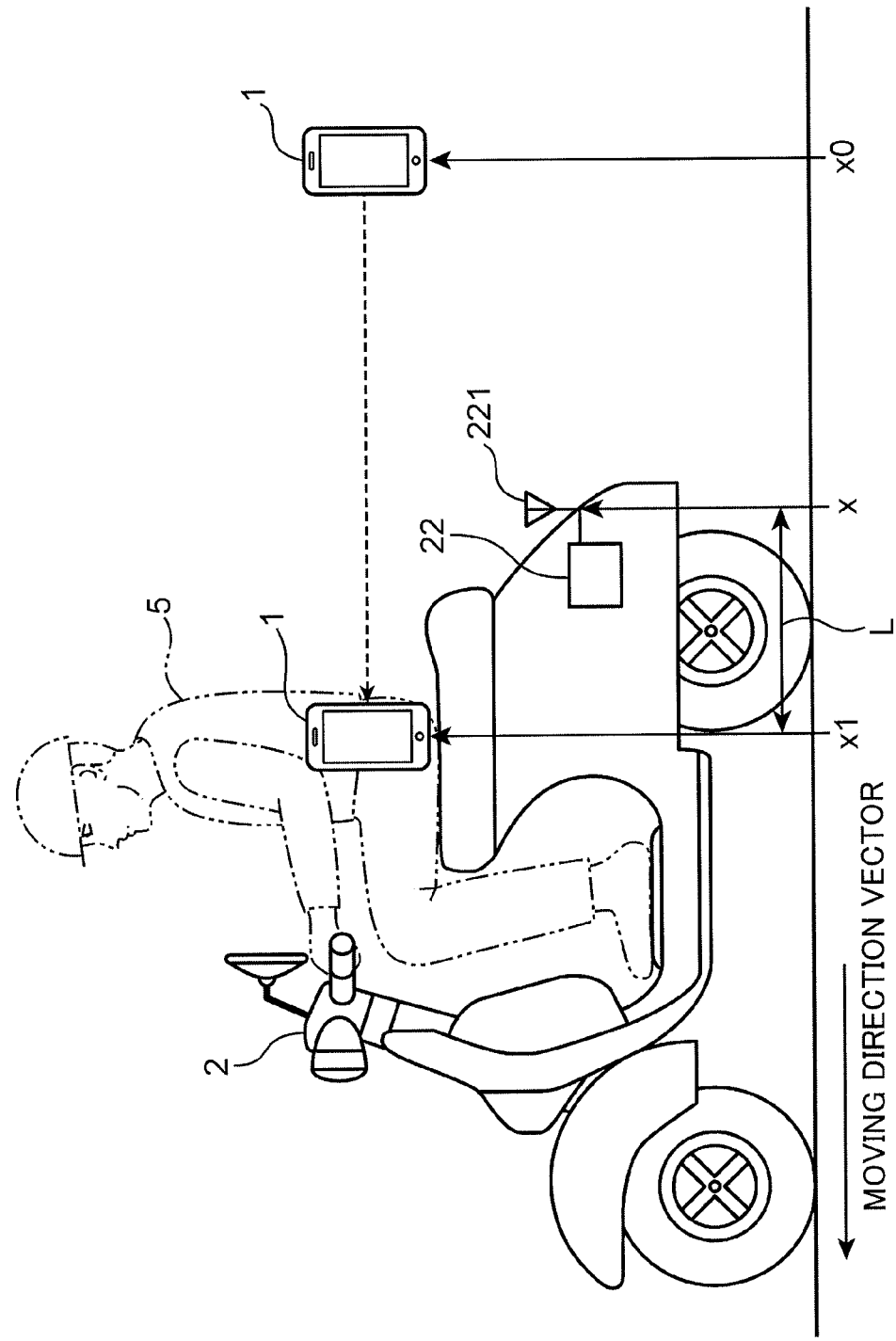
FIG. 9 is a schematic diagram for describing a correction method of terminal position information in the first embodiment in more detail.

FIG. 9 is a schematic diagram for describing the correction method of terminal position information in the first embodiment in more detail.

The mobility 2 illustrated in FIG. 9 is operated by a user 5. The user 5 carries the terminal 1. The mobility 2 includes the position measurement unit 22, which measures the position of the mobility 2. The position measurement unit 22 includes a receiving antenna 221 for receiving a signal from a GPS satellite. For example, the receiving antenna 221 is installed the rear side of the mobility 2. The installation position of the receiving antenna 221 is not limited to the rear side of the mobility 2.

First, the terminal position correction unit 334 calculates a moving direction vector of the terminal 1 based on an A-GPS value x1 that is the terminal position information acquired this time and an A-GPS value x0 that is the terminal position information acquired last time. The A-GPS value x1 and the A-GPS value x0 are represented by coordinates, and the moving direction vector is a unit direction vector.

Next, the terminal position correction unit 334 corrects the terminal position information to the position where the receiving antenna 221 exists based on the calculated moving direction vector, the A-GPS value x1 acquired this time, and a distance L between the position of the terminal 1 and the receiving antenna 221 in the mobility 2. The distance L is stored in the memory 32 in advance. The position of the terminal 1 in the mobility 2 is set to a center position of the seat, for example. Since the center position of the seat of the mobility 2 and the position of the receiving antenna 221 of the mobility 2 are known, the distance L can be calculated in advance. The position of the mobility 2 is the position of the receiving antenna 221, but when the position of the terminal 1 is set to the position of the mobility 2, an error of the distance L occurs. Therefore, the terminal position correction unit 334 corrects the position of the terminal 1 to the position where the receiving antenna 221 exists.

Note that, in a case where the mobility 2 is simultaneously used by a plurality of persons, such as a small commuter, the terminal position correction unit 334 may correct the position of each of the plurality of terminals 1 to the position where the receiving antenna 221 exists. In that case, the positional relationship between the boarding position of the user's seat or the like and the position of the receiving antenna 221 needs to be known.

The terminal position correction unit 334 calculates a corrected A-GPS value x by subtracting, from the A-GPS value x1 acquired this time, a value in which the distance L is multiplied by the moving direction vector.

Next, in step S49, the mobility position storage control unit 336 stores the terminal position information corrected by the terminal position correction unit 334 into the memory 32 in association with the pairing information as the position of the mobility 2.

On the other hand, when it is determined that the Euclidean distance is not equal to or less than the threshold value, that is, when it is determined that the Euclidean distance is longer than the threshold value (NO in step S47), the ratio determination unit 335 calculates in step S50 the ratio of the Euclidean distance longer than the threshold value among the plurality of Euclidean distances calculated in a predetermined past period. For example, the ratio determination unit 335 calculates a ratio of a Euclidean distance longer than the threshold value among the plurality of Euclidean distances calculated in the past 30 minutes. For example, the ratio determination unit 335 may calculate the ratio of the Euclidean distance longer than the threshold value among the 10 Euclidean distances calculated in the past.

Next, in step S51, the ratio determination unit 335 determines whether or not the calculated ratio is equal to or less than the threshold value. The threshold value is, for example, 10%.

The accuracy of the S-GPS value is low. Therefore, when the S-GPS value of the mobility 2 is temporarily not correctly measured, there is a possibility that the Euclidean distance between the A-GPS value of the terminal 1 and the S-GPS value of the mobility 2 is determined to be temporarily longer than the threshold value. In this manner, in consideration of the case where a Euclidean distance temporarily becomes longer than a threshold value, the ratio of the Euclidean distance longer than the threshold value among the plurality of Euclidean distances calculated in a predetermined past period is calculated, and it is determined whether or not the calculated ratio is equal to or less than the threshold value. When the calculated ratio is equal to or less than the threshold value, since it has failed to measure the accurate A-GPS value or S-GPS value, it can be determined that the Euclidean distance temporarily becomes longer than the threshold value. On the other hand, when the calculated ratio is greater than the threshold value, a state in which the Euclidean distance is longer than the threshold value continues, and there is a possibility that the terminal 1 is not moving together with the mobility 2. Therefore, when the calculated ratio is greater than the threshold value, the A-GPS value is not used as a position of the mobility 2, but the S-GPS value is used as a position of the mobility 2.

Here, when it is determined that the calculated ratio is equal to or less than the threshold value (YES in step S51), the processing proceeds to step S48.

On the other hand, when it is determined that the calculated ratio is not equal to or less than the threshold value, that is, when it is determined that the calculated ratio is greater than the threshold value (NO in step S51), the mobility position storage control unit 336 stores in step S52 the mobility position information into the memory 32 as the position of the mobility 2 in association with the pairing information.

Note that, when the calculated ratio is greater than the threshold value, the communication unit 31 may notify the sharing management server that there is a possibility that the mobility is improperly used.

Next, in step S53, the stop information reception unit 314 receives the stop information transmitted by the mobility 2. The stop information indicates whether or not the mobility 2 associated with the mobility ID is stopped.

Next, in step S54, the user ID specification unit 337 determines whether or not stop information indicating that the mobility 2 is stopped is received. Here, when it is determined that the stop information indicating that the mobility 2 is not stopped is received, that is, when it is determined that the stop information indicating that the mobility 2 is moving is received (NO in step S54), the processing returns to step S42.

On the other hand, when it is determined that the stop information indicating that the mobility 2 is stopped is received (YES in step S54), the user ID specification unit 337 specifies in step S55 the user ID of the user using the stopped mobility 2 based on the pairing information.

Next, in step S56, the stopping place determination unit 338 determines whether or not the terminal position information associated with the specified user ID is received immediately after the time when the stop information is received. For example, the stopping place determination unit 338 determines whether or not the terminal position information associated with the specified user ID is received in a period from the time when the stop information is received until a predetermined time elapses. The predetermined time is set based on the sampling cycle of the terminal position information, and is, for example, 15 seconds.

The stopping place determination unit 338 may determine whether or not the terminal position information associated with the specified user ID is received immediately before the time when the stop information is received. In this case, the stopping place determination unit 338 determines whether or not the terminal position information associated with the specified user ID is received in a period from the time when the stop information is received to a time a predetermined time before. The predetermined time is set based on the sampling cycle of the terminal position information, and is, for example, 15 seconds.

Here, when it is determined that the terminal position information is received immediately after the time when the stop information is received (YES in step S56), the stopping place determination unit 338 determines in step S57, as the stopping place of the mobility 2, the terminal position information received immediately after the time when the stop information is received.

On the other hand, when it is determined that the terminal position information is not received immediately after the time when the stop information is received (NO in step S56), the stopping place determination unit 338 determines in step S58, as the stopping place of the mobility 2, the mobility position information received immediately after the time when the stop information is received.

When the mobility position information is not received immediately after the time when the stop information is received in step S58, the stopping place determination unit 338 needs not determine the stopping place of the mobility 2.

When it is determined that the terminal position information is not received immediately after the time when the stop information is received, the stopping place determination unit 338 may determine whether or not the terminal position information is received immediately before the time when the stop information is received. When it is determined that the terminal position information is received immediately before the time when the stop information is received, the stopping place determination unit 338 may determine, as the stopping place of the mobility 2, the terminal position information received immediately before the time when the stop information is received. When it is determined that the terminal position information is not received immediately before the time when the stop information is received, the processing may proceed to step S58.

When the terminal position information and the mobility position information are not received within either the predetermined time immediately after the time when the stop information is received and the predetermined time immediately before the time when the stop information is received, the stopping place determination unit 338 may further extend the predetermined time immediately after the time when the stop information is received and the predetermined time immediately before the time when the stop information is received, and determine, as the stopping place of the mobility 2, the terminal position information or the mobility position information received within the extended time.

In this manner, since the terminal 1 is owned by the user using the mobility 2, the terminal moves together with the mobility 2. Therefore, the position of the terminal 1 is substantially the same as the position of the mobility 2. Therefore, when the accuracy of the terminal position information measured by the terminal 1 is higher than the accuracy of the mobility position information measured by the mobility 2, the terminal position information indicating the position of the terminal 1 is determined as the stopping place where the mobility 2 is stopped, whereby the stopping place where the mobility 2 is stopped can be specified with high accuracy. Since the terminal 1 owned by the user is used, it is not necessary to install a new facility, and the cost can be suppressed.

In the first embodiment, the mobility 2 may continuously acquire, from the terminal 1, terminal position information indicating the position of the terminal 1 and associated with the user ID. When acquiring the stop information indicating that the mobility 2 is stopped, the mobility 2 may determine, as the stopping place where the mobility 2 is stopped, the terminal position information acquired immediately before or immediately after the time when the stop information is acquired. Then, the mobility 2 may transmit the determined stopping place to the server 3.

Second Embodiment

In the first embodiment, the terminal 1 receives the mobility ID broadcasted by the mobility 2 by near field communication, and transmits, to the server 3, pairing information in which the user ID and the mobility ID are associated with each other. On the other hand, in the second embodiment, when the user reserves use of the mobility, the terminal transmits, to the server, pairing information in which the user ID and the mobility ID are associated with each other.

Figure 10:
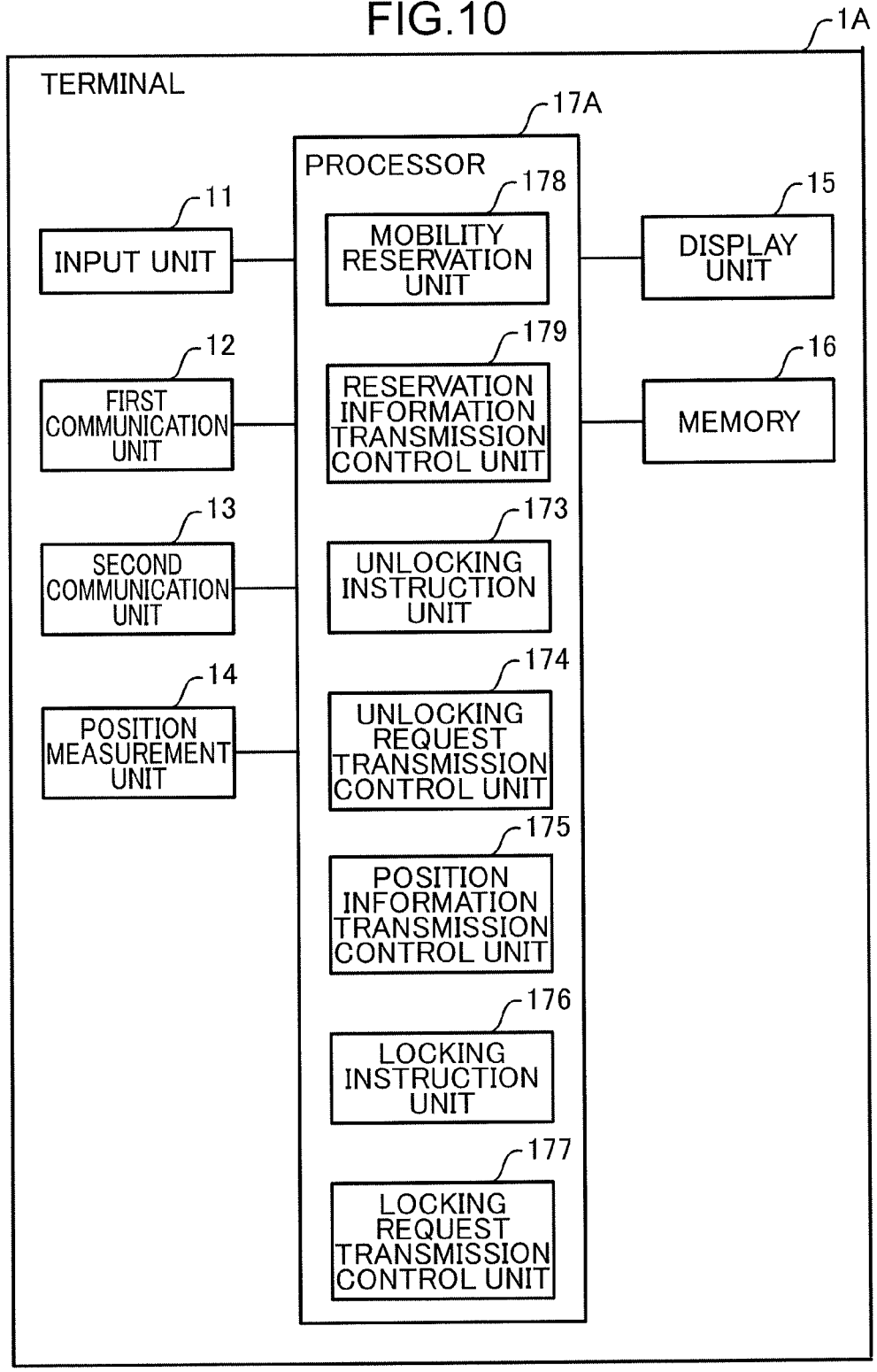
FIG. 10 is a view illustrating an example of a configuration of a terminal in a second embodiment of the present disclosure.

FIG. 10 is a view illustrating an example of the configuration of a terminal 1A in the second embodiment of the present disclosure.

The overall configuration of a mobility management system in the second embodiment is the same as the overall configuration of the mobility management system in the first embodiment illustrated in FIG. 1. In the second embodiment, the same components as those in the first embodiment are denoted by the same reference signs, and the description will be omitted.

The terminal 1 illustrated in FIG. 10 includes the input unit 11, the first communication unit 12, the second communication unit 13, the position measurement unit 14, the display unit 15, the memory 16, and a processor 17A.

The processor 17A is, for example, a CPU. The processor 17A implements the unlocking instruction unit 173, the unlocking request transmission control unit 174, the position information transmission control unit 175, the locking instruction unit 176, the locking request transmission control unit 177, a mobility reservation unit 178, and a reservation information transmission control unit 179.

The mobility reservation unit 178 receives the reservation of a mobility 2A before the user uses the mobility 2A. The mobility reservation unit 178 causes the display unit 15 to display a reservation input screen. The mobility reservation unit 178 receives information input by the user on the displayed reservation input screen. The information input by the user includes, for example, a user ID for identifying the user, a mobility ID for identifying the mobility 2A used by the user, a use start time, a use end time, a place of lending, and a place of returning.

The reservation information transmission control unit 179 causes the second communication unit 13 to transmit reservation information. The reservation information includes pairing information in which the user ID for identifying the user and the mobility ID for identifying the mobility 2A used by the user are associated with each other. The reservation information includes the use start time, the use end time, the place of lending, and the place of returning. The second communication unit 13 transmits the reservation information to a server 3A.

Figure 11:
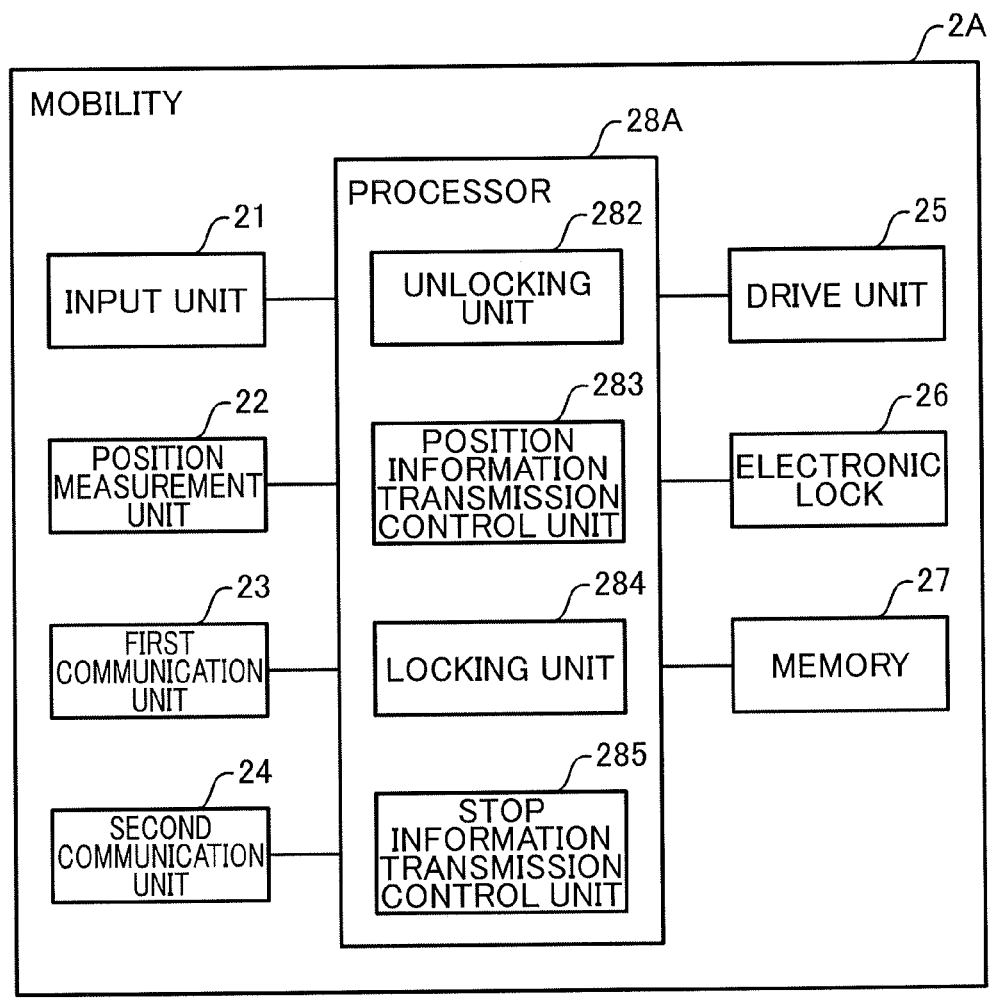
FIG. 11 is a view illustrating an example of a configuration of a mobility in the second embodiment of the present disclosure.

FIG. 11 is a view illustrating an example of the configuration of the mobility 2A in the second embodiment of the present disclosure. The mobility 2A is a mobility reserved by the user.

The mobility 2A illustrated in FIG. 11 includes the input unit 21, the position measurement unit 22, the first communication unit 23, the second communication unit 24, the drive unit 25, the electronic lock 26, the memory 27, and a processor 28A.

The processor 28A is, for example, a CPU. The processor 28A includes the unlocking unit 282, the position information transmission control unit 283, the locking unit 284, and the stop information transmission control unit 285.

Unlike the processor 28 of the mobility 2 in the first embodiment, the processor 28A of the mobility 2A in the second embodiment does not include the mobility ID transmission control unit 281.

Figure 12:
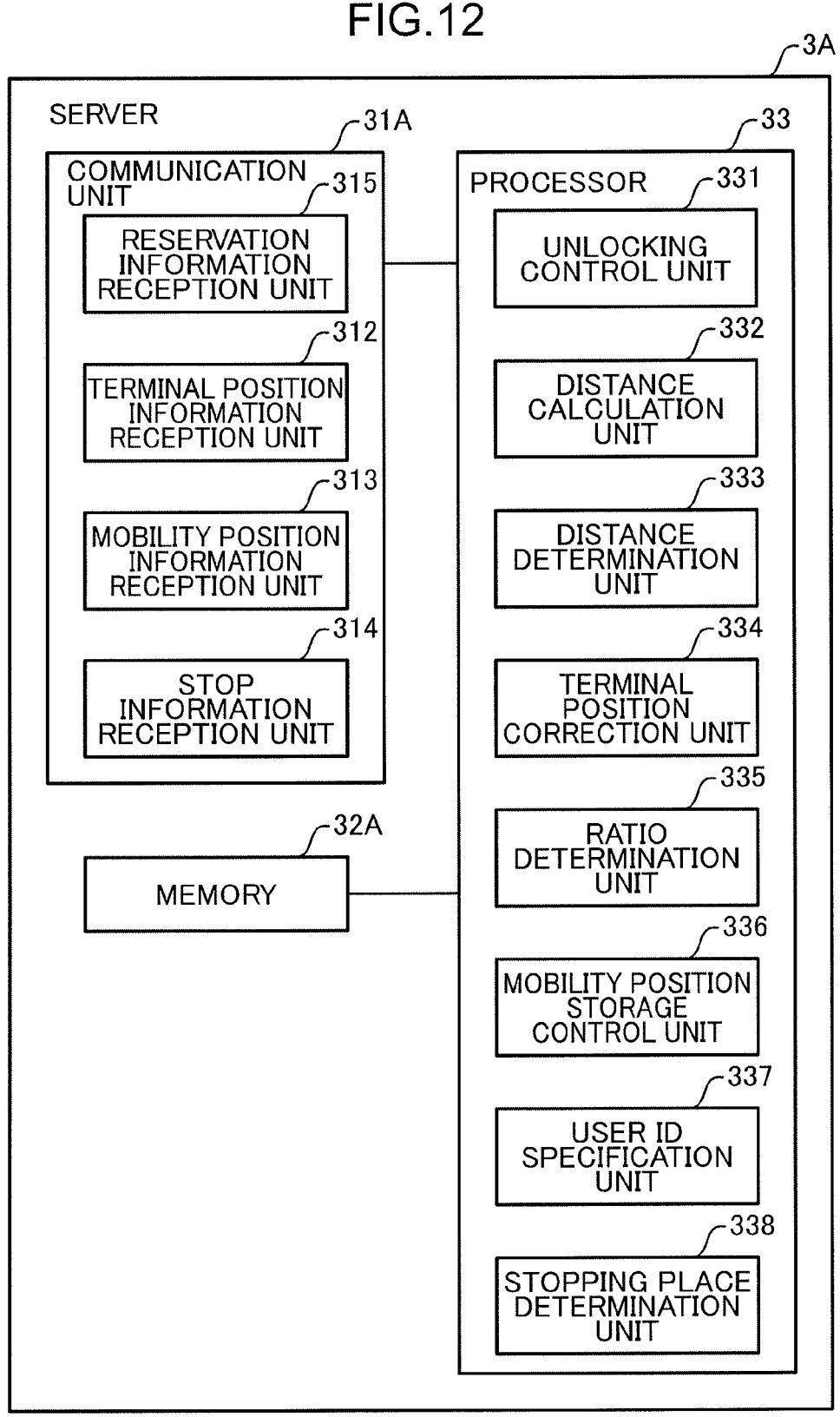
FIG. 12 is a view illustrating an example of a configuration of a server in the second embodiment of the present disclosure.

FIG. 12 is a view illustrating an example of the configuration of the server 3A in the second embodiment of the present disclosure.

The server 3A illustrated in FIG. 12 includes a communication unit 31A, a memory 32A, and the processor 33.

The communication unit 31A includes the terminal position information reception unit 312, the mobility position information reception unit 313, the stop information reception unit 314, and a reservation information reception unit 315.

When the user reserves use of the mobility 2A, the reservation information reception unit 315 acquires, from the terminal 1A, pairing information in which the user ID for identifying the user and the mobility ID for identifying the mobility 2 used by the user are associated with each other. The reservation information reception unit 315 receives the reservation information transmitted by the terminal 1A. The reservation information includes pairing information. The reservation information includes the use start time, the use end time, the place of lending, and the place of returning.

The memory 32A is, for example, a semiconductor memory or a hard disk drive. The memory 32A stores the pairing information included in the reservation information received by the reservation information reception unit 315. The memory 32A stores, together with the pairing information, a history of the terminal position information associated with the user ID and a history of the mobility position information associated with the mobility ID.

Next, the operation of the terminal 1A in the second embodiment of the present disclosure will be described.

Figure 13:
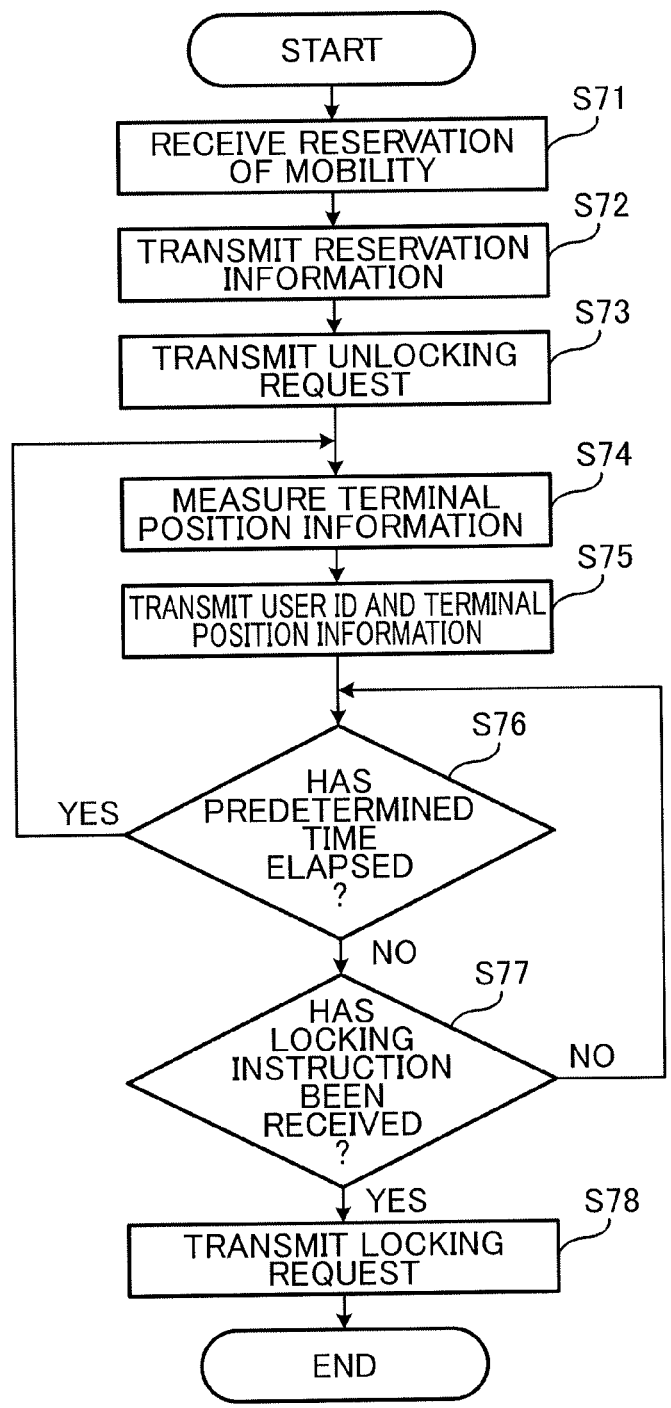
FIG. 13 is a flowchart for describing an operation of the terminal in the second embodiment of the present disclosure.

FIG. 13 is a flowchart for describing the operation of the terminal 1A in the second embodiment of the present disclosure.

First, in step S71, the mobility reservation unit 178 receives the reservation of the mobility 2A by the user. The input unit 11 receives input of a use start time, a use end time, a place of lending, and a place of returning by the user, and also receives selection of a mobility to be used. For example, the mobility reservation unit 178 presents a plurality of mobilities available at the place of lending input by the user, and receives selection of the mobility desired by the user from among the plurality of presented mobilities. In the second embodiment, the mobility 2A is selected by the user.

Next, in step S72, the reservation information transmission control unit 179 causes the second communication unit 13 to transmit reservation information including pairing information in which the user ID stored in advance in the memory 16 is associated with the mobility ID of the mobility reserved by the user. The second communication unit 13 transmits the reservation information to a server 3A.

Next, in step S73, the unlocking request transmission control unit 174 causes the first communication unit 12 to transmit an unlocking request for unlocking the mobility 2A. The unlocking request is transmitted when the user actually uses the mobility 2A. Therefore, there is a case where a time difference occurs between the transmission of the reservation information in step S72 and the transmission of the unlocking request in step S73.

The processing of steps S73 to S78 is the same as the processing of steps S4 to S9 illustrated in FIG. 5, and therefore description thereof is omitted.

Next, the operation of the mobility 2A in the second embodiment of the present disclosure will be described.

Figure 14:
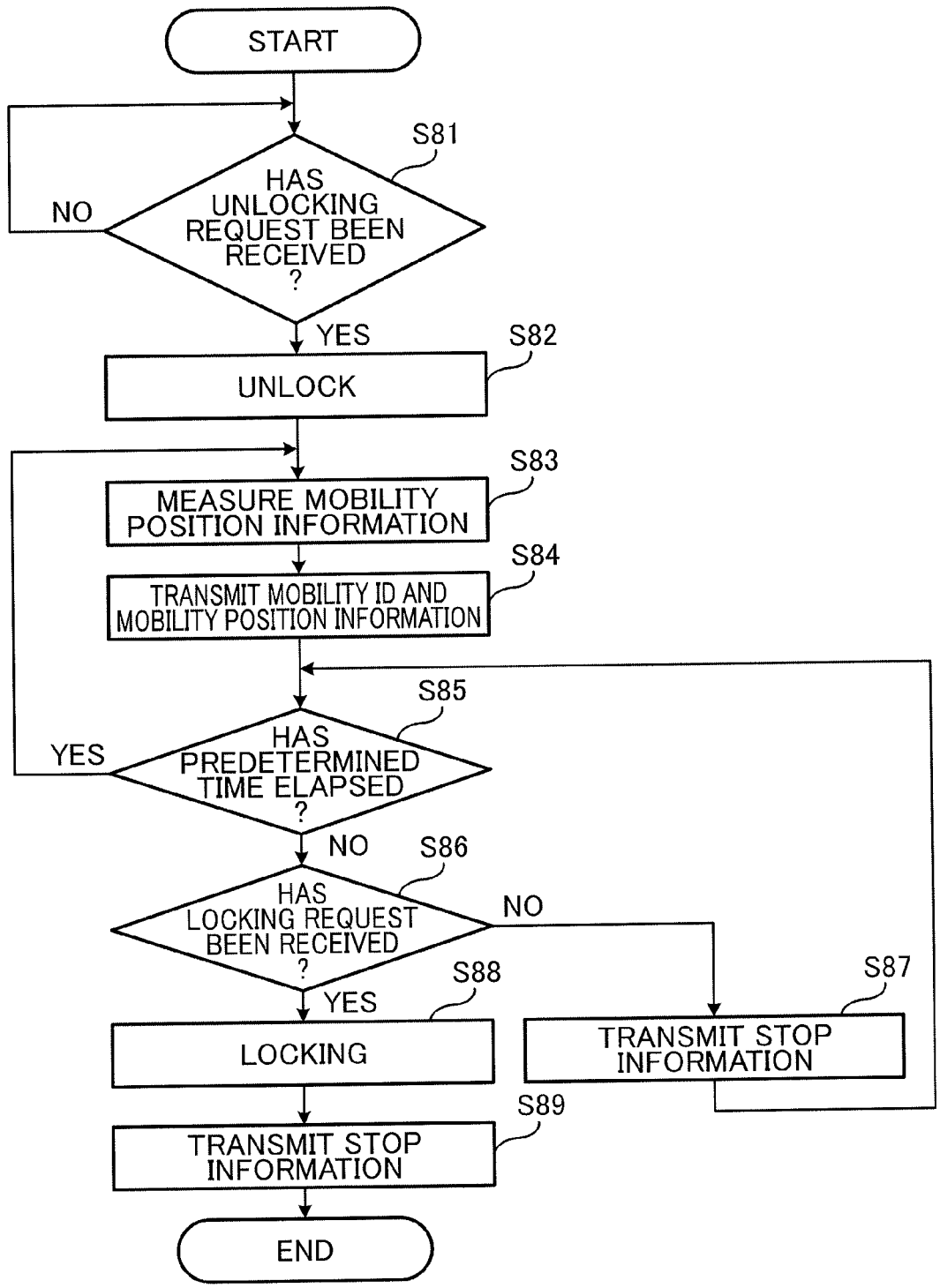
FIG. 14 is a flowchart for describing an operation of the mobility in the second embodiment of the present disclosure.

FIG. 14 is a flowchart for describing the operation of the mobility 2A in the second embodiment of the present disclosure.

First, in step S81, the unlocking unit 282 determines whether or not the first communication unit 23 has received the unlocking request. The first communication unit 23 receives the unlocking request transmitted by the terminal 1. Here, when it is determined that the unlocking request has not been received (NO in step S81), the processing of step S81 is performed until the unlocking request is received.

On the other hand, when it is determined that the unlocking request has been received (YES in step S81), the unlocking unit 282 unlocks the electronic lock 26 of the mobility 2A in step S82.

The processing of steps S82 to S89 is the same as the processing of steps S23 to S30 illustrated in FIG. 6, and therefore description thereof is omitted.

Next, the operation of the server 3A in the second embodiment of the present disclosure will be described.

Figure 15:
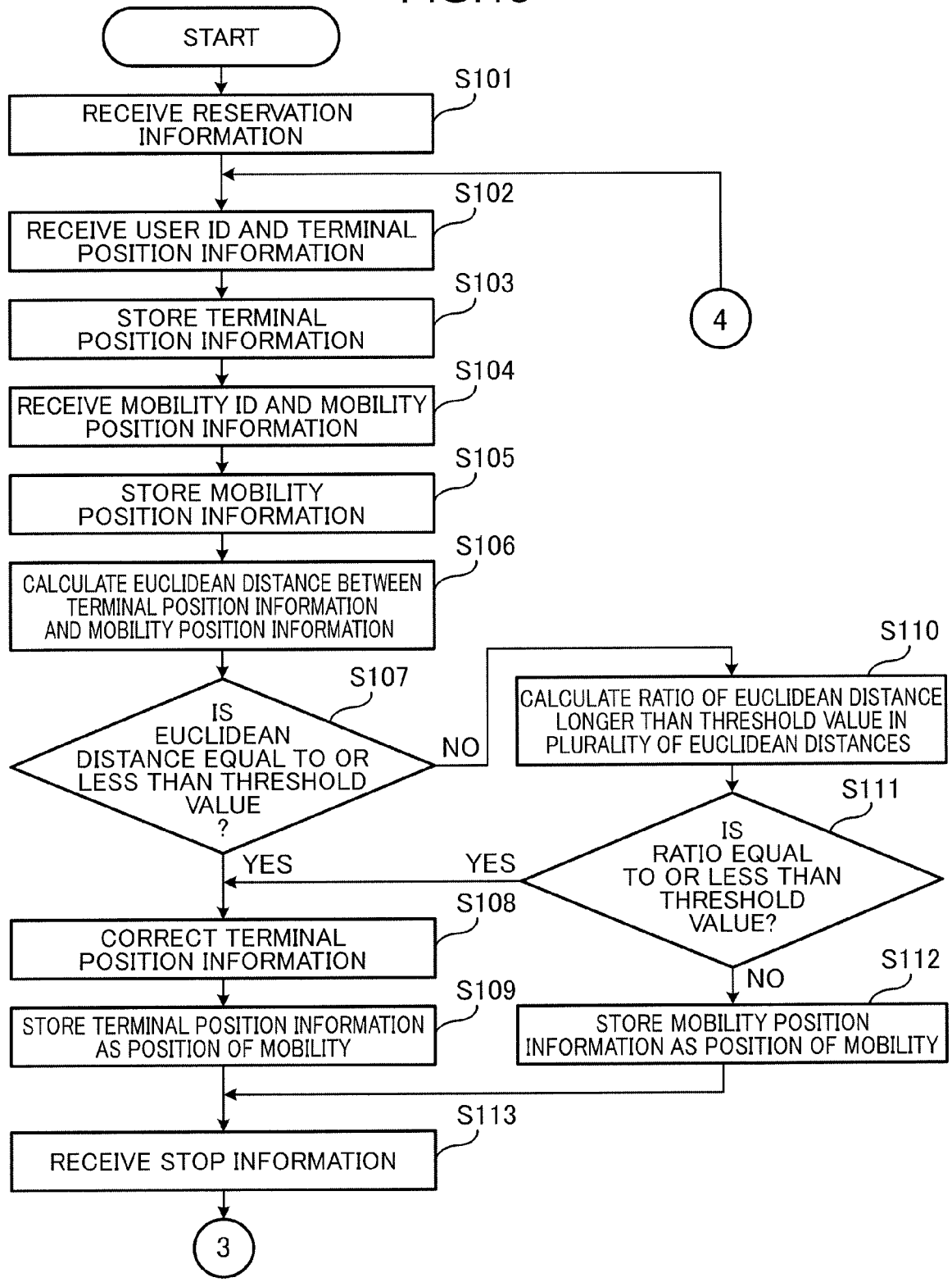
FIG. 15 is a first flowchart for describing an operation of the server in the second embodiment of the present disclosure.
Figure 16:
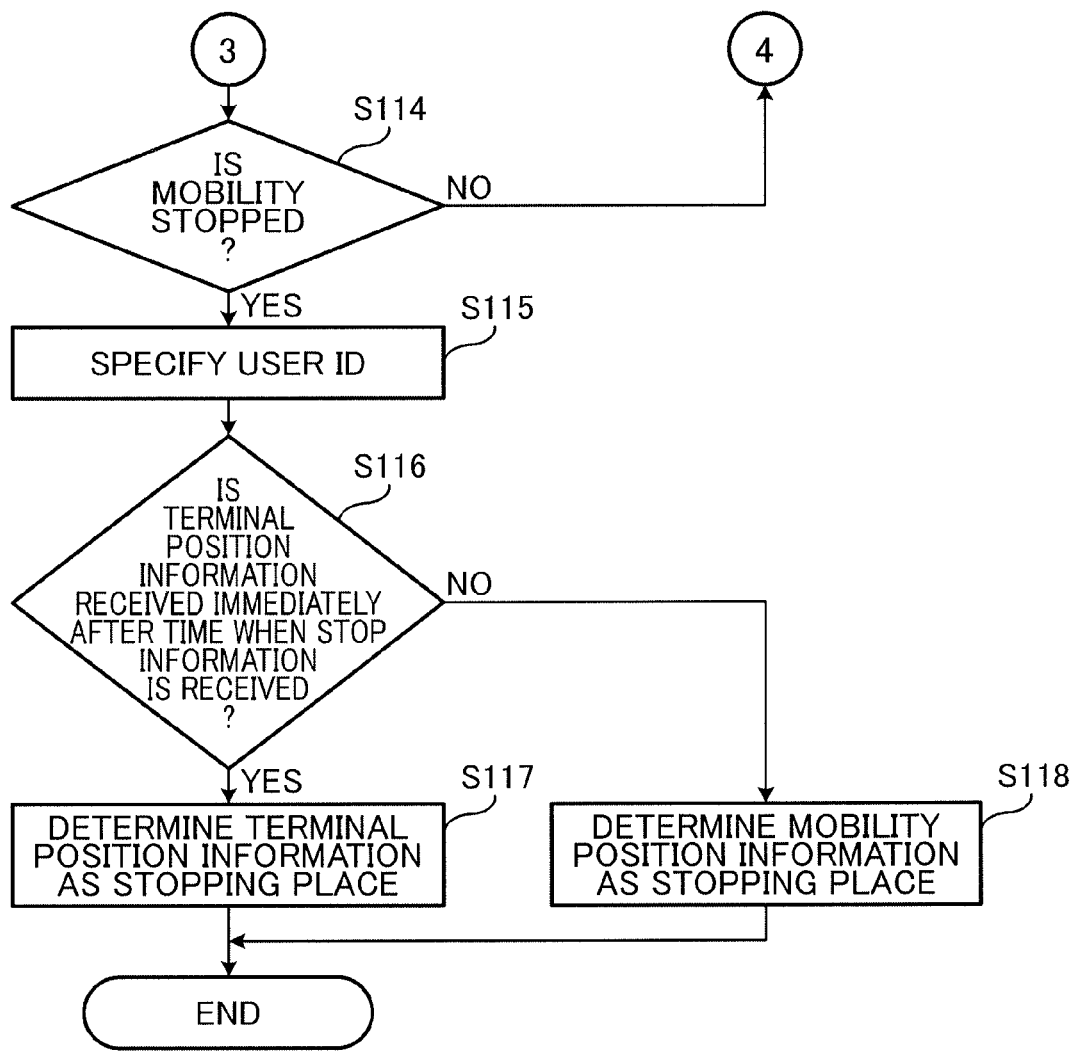
FIG. 16 is a second flowchart for describing the operation of the server in the second embodiment of the present disclosure.

FIG. 15 is a first flowchart for describing the operation of the server 3A in the second embodiment of the present disclosure, and FIG. 16 is a second flowchart for describing the operation of the server 3A in the second embodiment of the present disclosure.

First, in step S101, the reservation information reception unit 315 receives the reservation information transmitted by the terminal 1A. The reservation information includes pairing information in which the user ID for identifying the user and the mobility ID for identifying the mobility 2A used by the user are associated with each other. The reservation information includes the use start time, the use end time, the place of lending, and the place of returning. The reservation information reception unit 315 stores, into memory 32A, the pairing information included in the received reservation information.

The processing of steps S102 to S118 is the same as the processing of steps S42 to S58 illustrated in FIGS. 7 and 8, and therefore description thereof is omitted.

In this manner, in the terminal 1A, when the user reserves use of mobility 2A, the user ID and the mobility ID of the mobility 2A reserved by the user can be associated with each other.

In the first and second embodiments, the mobility 2 includes the position measurement unit 22 and the position information transmission control unit 283, but the present disclosure is not particularly limited to this, and the mobility 2 needs not include the position measurement unit 22 and the position information transmission control unit 283.

In each of the above embodiments, each constituent element may be implemented by being configured with dedicated hardware or by executing a software program suitable for each constituent element. Each constituent element may be implemented by a program execution unit such as a CPU or a processor reading and executing a software program recorded in a recording medium such as a hard disk or a semiconductor memory. The program may be carried out by another independent computer system by recording and transferring the program onto a recording medium or transferring the program via a network.

Some or all of the functions of the devices according to the embodiments of the present disclosure are implemented as large scale integration (LSI), which is typically an integrated circuit. These may be individually integrated into one chip, or may be integrated into one chip so as to include some or all of them. The circuit integration is not limited to LSI, and may be implemented by a dedicated circuit or a general-purpose processor. A field programmable gate array (FPGA), which can be programmed after manufacturing of LSI, or a reconfigurable processor in which connections and settings of circuit cells inside LSI can be reconfigured may be used.

Some or all of the functions of the devices according to the embodiments of the present disclosure may be implemented by a processor such as a CPU executing a program.

The numbers used above are all illustrated to specifically describe the present disclosure, and the present disclosure is not limited to the illustrated numbers.

The order in which each step illustrated in the above flowcharts is executed is for specifically describing the present disclosure, and may be an order other than the above order as long as a similar effect is obtained. Some of the above steps may be executed simultaneously (concurrently) with other steps.

INDUSTRIAL APPLICABILITY

Since the technique according to the present disclosure can specify with high accuracy the position information of a mobility, it is useful for the technique of specifying the position information of a mobility.

The invention claimed is:

1. An information processing method comprising:
by a computer,
acquiring, from a terminal owned by a user, pairing information in which a user ID for identifying the user and a mobility ID for identifying a mobility used by the user are associated with each other;
continuously acquiring, from the terminal, terminal position information indicating a position of the terminal and associated with the user ID;
specifying the user ID of the user using the mobility that is stopped, based on the pairing information; and
determining, as position information of the mobility, the terminal position information associated with the user ID having been specified,
continuously acquiring, from the mobility, mobility position information indicating a position of the mobility and associated with the mobility ID;
acquiring, from the mobility, stop information indicating whether or not the mobility is stopped and associated with the mobility ID;
when the stop information indicating that the mobility is not stopped is acquired, calculating a distance between the terminal position information and the mobility position information; and
when the distance is equal to or less than a threshold value, correcting the terminal position information to a position where a receiving antenna of a position measurement device for measuring the position of the mobility installed in the mobility exists, and storing the terminal position information having been corrected as the position of the mobility that is traveling.

2. The information processing method according to claim 1,
wherein in specifying the user ID, when the stop information indicating that the mobility is stopped is acquired, the user ID of the user using the mobility that is stopped is specified based on the pairing information, and
in determining the position information, the terminal position information that is acquired immediately before or immediately after a time when the stop information is acquired and is associated with the user ID is determined as a stopping place where the mobility is stopped.

3. The information processing method according to claim 2,
wherein in determining the stopping place,
whether or not the terminal position information associated with the user ID having been specified has been acquired immediately before or immediately after the time when the stop information is acquired is determined,
when the computer determines that the terminal position information associated with the user ID having been specified has been acquired immediately before or immediately after the time when the stop information is acquired, the terminal position information having been acquired is determined as the stopping place where the mobility is stopped, and
when the computer determines that the terminal position information associated with the user ID having been specified has not been acquired immediately before or immediately after the time when the stop information is acquired, the mobility position information associated with the mobility ID associated with the user ID having been specified, acquired immediately before or immediately after the time when the stop information is acquired is determined as the stopping place where the mobility is stopped.

4. The information processing method according to claim 1, wherein
the mobility includes a position measurement unit that measures the mobility position information, and
a first accuracy of the terminal position information is higher than a second accuracy of the mobility position information.

5. The information processing method according to claim 4, wherein
the terminal position information includes an assisted global positioning system (GPS) value, and
the mobility position information includes a standalone GPS value.

6. The information processing method according to claim 1, further comprising:
when the distance is longer than the threshold value, calculating a ratio of a distance longer than the threshold value among a plurality of distances calculated in a predetermined past period,
when the ratio having been calculated is equal to or less than a second threshold value, correcting the terminal position information to the position where the receiving antenna of the position measurement device for measuring the position of the mobility installed in the mobility exists, and storing the terminal position information having been corrected as the position of the mobility that is traveling, and
when the ratio having been calculated is greater than the second threshold value, storing the mobility position information as the position of the mobility that is traveling.

7. The information processing method according to claim 1, wherein in correcting the terminal position information, a moving direction of the terminal is calculated based on the terminal position information acquired this time and the terminal position information acquired last time, and the terminal position information is corrected to the position where the receiving antenna exists based on the calculated moving direction, the terminal position information acquired this time, and a distance between the position of the terminal and the receiving antenna in the mobility stored in advance.

8. The information processing method according to claim 1,
wherein in acquiring the pairing information, the pairing information in which the user ID is associated with the mobility ID is received by near field communication when the user starts use of the mobility.

9. The information processing method according to claim 1, wherein in acquiring the pairing information, when the user reserves use of the mobility, the pairing information is acquired from the terminal.

10. An information processing device comprising:
a pairing information acquisition unit that acquires, from a terminal owned by a user, pairing information in which a user ID for identifying the user and a mobility ID for identifying a mobility used by the user are associated with each other;
a terminal position information acquisition unit that continuously acquires, from the terminal, terminal position information indicating a position of the terminal and associated with the user ID;

a specification unit that specifies the user ID of the user using the mobility that is stopped, based on the pairing information; and a determination unit that determines, as position information of the mobility, the terminal position information associated with the user ID having been specified, a mobility position information acquisition unit that continuously acquires, from the mobility, mobility position information indicating a position of the mobility and associated with the mobility ID;

a stop information acquisition unit that acquires, from the mobility, stop information indicating whether or not the mobility is stopped and associated with the mobility ID;

a distance calculation unit that calculates, when the stop information indicating that the mobility is not stopped is acquired, a distance between the terminal position information and the mobility position information; and a correction unit that corrects, when the distance is equal to or less than a threshold value, the terminal position information to a position where a receiving antenna of a position measurement device for measuring the position of the mobility installed in the mobility exists, and stores the terminal position information having been corrected as the position of the mobility that is traveling.

11. A non-transitory computer readable recording medium storing an information processing program that causes a computer to function to acquire, from a terminal owned by a user, pairing information in which a user ID for identifying the user and a mobility ID for identifying a mobility used by the user are associated with each other, continuously acquire, from the terminal, terminal position information indicating a position of the terminal and associated with the user ID, specify the user ID of the user using the mobility that is stopped, based on the pairing information, and determine, as position information of the mobility, the terminal position information associated with the user ID having been specified, continuously acquire, from the mobility, mobility position information indicating a position of the mobility and associated with the mobility ID;

acquire, from the mobility, stop information indicating whether or not the mobility is stopped and associated with the mobility ID;

when the stop information indicating that the mobility is not stopped is acquired, calculate a distance between the terminal position information and the mobility position information; and when the distance is equal to or less than a threshold value, correct the terminal position information to a position where a receiving antenna of a position measurement device for measuring the position of the mobility installed in the mobility exists, and store the terminal position information having been corrected as the position of the mobility that is traveling.

* * * * *